(12) United States Patent
Akeley et al.

(10) Patent No.: US 10,038,909 B2
(45) Date of Patent: Jul. 31, 2018

(54) COMPRESSION OF LIGHT FIELD IMAGES

(71) Applicant: Lytro Inc., Mountain View, CA (US)

(72) Inventors: Kurt Akeley, Saratoga, CA (US); Brendan Bevensee, San Jose, CA (US); Colvin Pitts, Snohomish, WA (US); Timothy James Knight, Sunnyvale, CA (US); Carl Warren Craddock, San Francisco, CA (US); Chia-Kai Liang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/203,683

(22) Filed: Jul. 6, 2016

(65) Prior Publication Data

US 2016/0316218 A1    Oct. 27, 2016

Related U.S. Application Data

(62) Division of application No. 14/261,144, filed on Apr. 24, 2014, now Pat. No. 9,414,087.

(51) Int. Cl.
| | |
|---|---|
| G06K 9/36 | (2006.01) |
| H04N 19/426 | (2014.01) |
| H04N 19/60 | (2014.01) |
| H04N 19/186 | (2014.01) |
| H04N 19/182 | (2014.01) |

(Continued)

(52) U.S. Cl.
CPC ....... *H04N 19/426* (2014.11); *G02B 27/0075* (2013.01); *G06K 9/6218* (2013.01); *H04N 19/172* (2014.11); *H04N 19/182* (2014.11); *H04N 19/184* (2014.11); *H04N 19/186* (2014.11); *H04N 19/597* (2014.11); *H04N 19/60* (2014.11)

(58) Field of Classification Search
CPC .... H04N 19/60; H04N 19/186; H04N 19/182; H04N 19/172; H04N 19/184; H04N 19/597; G06K 9/6218
USPC .................................................. 382/232–233
See application file for complete search history.

(56) References Cited

U.S. PATENT DOCUMENTS

| | | |
|---|---|---|
| 5,907,619 A | 5/1999 | Davis |
| 6,023,523 A | 2/2000 | Cohen et al. |

(Continued)

OTHER PUBLICATIONS

Chang, C.L., et al., "Light Field Compression Using Disparity-Compensated Lifting and Shape Adaptation," IEEE Trans. Image Processing, vol. 15, No. 4, pp. 793-806, Apr. 2006. http://www.stanford.edu/~bgirod/pdfs/ChangZhuRamanathanTransIP2006.pdf.

(Continued)

*Primary Examiner* — Iman K Kholdebarin

(57) ABSTRACT

RAW images and/or light field images may be compressed through the use of specialized techniques. The color depth of a light field image may be reduced through the use of a bit reduction algorithm such as a K-means algorithm. The image may then be retiled to group pixels of similar intensities and/or colors. The retiled image may be padded with extra pixel rows and/or pixel columns as needed, and compressed through the use of an image compression algorithm. The compressed image may be assembled with metadata pertinent to the manner in which compression was done to form a compressed image file. The compressed image file may be decompressed by following the compression method in reverse.

23 Claims, 26 Drawing Sheets

(51) Int. Cl.
*H04N 19/172* (2014.01)
*G02B 27/00* (2006.01)
*H04N 19/597* (2014.01)
*H04N 19/184* (2014.01)
*G06K 9/62* (2006.01)

(56) References Cited

U.S. PATENT DOCUMENTS

| | | | |
|---|---|---|---|
| 6,091,860 | A | 7/2000 | Dimitri |
| 7,034,866 | B1 | 4/2006 | Colmenarez et al. |
| 7,792,423 | B2 * | 9/2010 | Raskar ............... G02B 27/0075 250/237 R |
| 7,936,377 | B2 | 5/2011 | Friedhoff |
| 8,103,111 | B2 | 1/2012 | Horie |
| 8,155,456 | B2 | 4/2012 | Babacan et al. |
| 8,290,358 | B1 | 10/2012 | Georgiev |
| 8,605,199 | B2 | 12/2013 | Imai |
| 8,754,829 | B2 * | 6/2014 | Lapstun ............. H04N 13/0402 345/419 |
| 8,941,771 | B2 | 1/2015 | Iwane |
| 9,191,560 | B2 * | 11/2015 | Suzuki .................. H04N 5/361 |
| 9,210,315 | B2 * | 12/2015 | Nakajima .......... H04N 5/23212 |
| 2003/0123700 | A1 | 7/2003 | Wakao |
| 2005/0031203 | A1 | 2/2005 | Fukuda |
| 2007/0030357 | A1 | 2/2007 | Levien et al. |
| 2008/0018668 | A1 | 1/2008 | Yamauchi |
| 2008/0144952 | A1 | 6/2008 | Chen et al. |
| 2009/0185051 | A1 | 7/2009 | Sano |
| 2009/0268970 | A1 | 10/2009 | Babacan et al. |
| 2011/0129165 | A1 | 6/2011 | Lim et al. |
| 2011/0234841 | A1 | 9/2011 | Akeley et al. |
| 2012/0249550 | A1 | 10/2012 | Akeley et al. |
| 2013/0093944 | A1 | 4/2013 | Fukami |

OTHER PUBLICATIONS

Magnor, M., et al., "Model-Aided Coding of Multi-Viewpoint Image Data," Proc. IEEE International Conference on Image Processing, ICIP-2000, Vancouver, Canada, Sep. 2000. https://graphics.tu-bs.de/static/people/magnor/publications/icip00.pdf.
JPEG: http://en.wikipedia.org/wiki/JPEG . Retrieved Jun. 3, 2014.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
H264: http://en.wikipedia.org/wiki/H264. Retrieved Jun. 3, 2014.
Fattal, Raanan, et al., "Gradient Domain High Dynamic Range Compression", ACM SIGGRAPH 2002.

* cited by examiner

| Table index | Table value |
|---|---|
| 0 | 0 |
| 1 | 0 |
| 2 | 1 |
| 3 | 1 |
| 4 | 2 |
| 5 | 2 |
| 6 | 3 |
| 7 | 3 |

*Fig. 7A*

| Table index | Table value |
|---|---|
| 0 | 0 |
| 1 | 0 |
| 2 | 0 |
| 3 | 0 |
| 4 | 1 |
| 5 | 1 |
| 6 | 2 |
| 7 | 3 |

*Fig. 7B*

| Table index | Table value |
|---|---|
| 0 | 0 |
| 1 | |
| 2 | |
| 3 | |
| 4 | |
| 5 | |
| 6 | |
| 7 | |
| 8 | 1 |
| 9 | |
| 10 | |
| 11 | |
| 12 | 2 |
| 13 | |
| 14 | |
| 15 | 3 |

| Table index | Table value |
|---|---|
| 0 | 0 |
| 1 | 0 |
| 2 | 0 |
| 3 | 0 |
| 4 | 0 |
| 5 | 1 |
| 6 | 1 |
| 7 | 1 |
| 8 | 1 |
| 9 | 1 |
| 10 | 1 |
| 11 | 2 |
| 12 | 2 |
| 13 | 2 |
| 14 | 3 |
| 15 | 3 |

Lookup table

| Table index | Table value |
|---|---|
| 0 | 0 |
| 1 | 0 |
| 2 | 0 |
| 3 | 0 |
| 4 | 1 |
| 5 | 1 |
| 6 | 2 |
| 7 | 3 |

Inverse lookup table

| Table index | Table value |
|---|---|
| 0 | 1 |
| 1 | 4 |
| 2 | 6 |
| 3 | 7 |

*Fig. 16*

COMPRESSION OF LIGHT FIELD IMAGES

CROSS-REFERENCE TO RELATED APPLICATION

The present application is a divisional of U.S. application Ser. No. 14/261,144 for "Compression of Light Field Images", filed Apr. 24, 2014, the disclosure of which is incorporated herein by reference in its entirety.

FIELD OF THE INVENTION

The present invention relates to systems and methods for compressing and storing digital media such as two-dimensional images projected from light field data.

BACKGROUND

The advent of digital image capture technologies has revolutionized the photography industry. Digital cameras can now take pictures in high-resolution formats in which each image has several million pixels. The size of such images, along with the limited storage capacity typically available, has prompted the development of many different image compression algorithms. Many of these algorithms function based on grouping pixels of similar colors together and removing variations that are not generally perceptible to the human eye.

Light field cameras capture not just a two-dimensional image, but also light field data related to the angle of incidence of light received at various locations within the image. Such data is captured by causing the light to pass through a microlens array (MLA) positioned between the main lens and the image capture sensor. The resulting image may have a plurality of pixel clusters, each of which represents light that passed through a single microlens of the microlens array. Capture of directional information in this manner facilitates various operations, such as refocusing and other forms of image manipulation that are not possible with conventional images.

Because they include significant amounts of information not present in conventional images, light field image files may be very large. Unfortunately, the presence of a microlens pattern superimposed on the representation of the scene can result in rapidly varying content within the light field image file; this high-frequency spatial variation in pixel intensity can result in poor performance when applying conventional image compression techniques.

SUMMARY

According to various embodiments, the system and method of the present invention provide mechanisms for compressing two-dimensional images projected from light field data, while avoiding the above-described problems that result from the high-frequency spatial variation in pixel intensity inherent in light field image data.

A light field image may be received, for example, from a light field camera. According to various embodiments, the light field image may be compressed in a number of steps that may include any or all of the following steps: (1) reducing a color depth of the pixels of the image, (2) retiling the image, (3) padding the image so that it is sized for optimal performance of an image compression algorithm, (4) applying the image compression algorithm to the image, and/or (5) assembling the resulting compressed image with metadata. These steps need not all be performed in every embodiment.

If desired, the color depth reduction step may include the use of a K-means bit reduction algorithm. Such an algorithm may be used, for example, to reduce the color depth of the pixels of the image from 12 bits to 8 bits, which may help to enhance performance of the image compression algorithm. Color depth reduction parameters may be included in the metadata of the compressed image to indicate how color depth reduction was performed on the image.

The retiling step may be used further enhance the performance of the image compression algorithm by grouping pixels of similar colors and/or similar intensities together for image compression purposes. The image may be a RAW image, and may also be Bayer filtered image or the like. Thus, the image may have groups of 2×2 pixels, each of which has an intensity obtained from light filtered through red, green, or blue filters. The retiling step may be used to group pixels of each color together, thereby reducing the spatial intensity variation and improving compression performance.

A light field image may include a plurality of pixel clusters, each of which encodes a portion of the light field data corresponding to a microlens of the microlens array of the light field camera. Each pixel cluster may have pixels horizontally and vertically arranged in a grid pattern. In at least one embodiment, the image is retiled according to the period of the microlens array; this results in, retiled pixel clusters wherein adjacent pixels are relatively similar in intensity. The arrangement of retiled pixels ensures that there is a one-to-one correspondence between the pixels of each pixel cluster and the retiled pixel clusters of the retiled image, while reducing spatial intensity variation and thereby improving compression performance. In at least one embodiment, the retiled pixel clusters may be arranged in a grid pattern that corresponds to the relative positions of each pixel within each pixel cluster were arranged. In at least one embodiment, a mapping of pixels from the pixel clusters to the retiled pixel clusters may be included in the metadata of the compressed image.

Padding the image may involve adding one or more pixel rows and/or pixel columns to the image so that it is the appropriate size for application of the image compression algorithm. The added pixel rows and/or pixel columns may be duplicates of the adjacent edge a pixel column and/or edge pixel row. In at least one embodiment, padding parameters that indicate how pixels were added to the retiled image may be included in the compressed image.

Applying the image compression algorithm to the image may entail applying a known lossless or lossy image compression algorithm such as that developed by the Joint Photographic experts Group, known as "JPEG" compression. Additionally or alternatively, application of the image compression algorithm may entail application of one or more novel techniques for compressing an image, as described herein. The image compression algorithm may be applied to the retiled image; the performance of the image compression algorithm may be enhanced by the color depth reduction, retiling, and/or padding steps performed previously.

The compressed image may be processed through the use of a method with steps that are, generally, the reverse of the steps applied to compress the image. Thus, the image compression algorithm may be applied in reverse. The padding may be reversed by removing the extra pixel columns and/or rows. The compressed image may be retiled again such that the pixels originally in each pixel cluster are again grouped together, and the color depth of the pixels may again be increased. The metadata of the compressed image, which may contain any of the components set forth above, may be used to facilitate any of the foregoing steps.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIGS. 7A and 7B depict two exemplary lookup tables that map three-bit raw pixel values to two-bit encoded, lower precision values.

FIG. 11A depicts a 4×3 grid of pixels of a full-color YUV image.

FIG. 11B depicts a 4×3 grid of pixels of a full-color 422-sub-sampled YUV image.

FIG. 16 depicts an exemplary inverse lookup table mapping two-bit encoded pixel values to 3-bit raw values.

DETAILED DESCRIPTION

Definitions

Figure 1A:
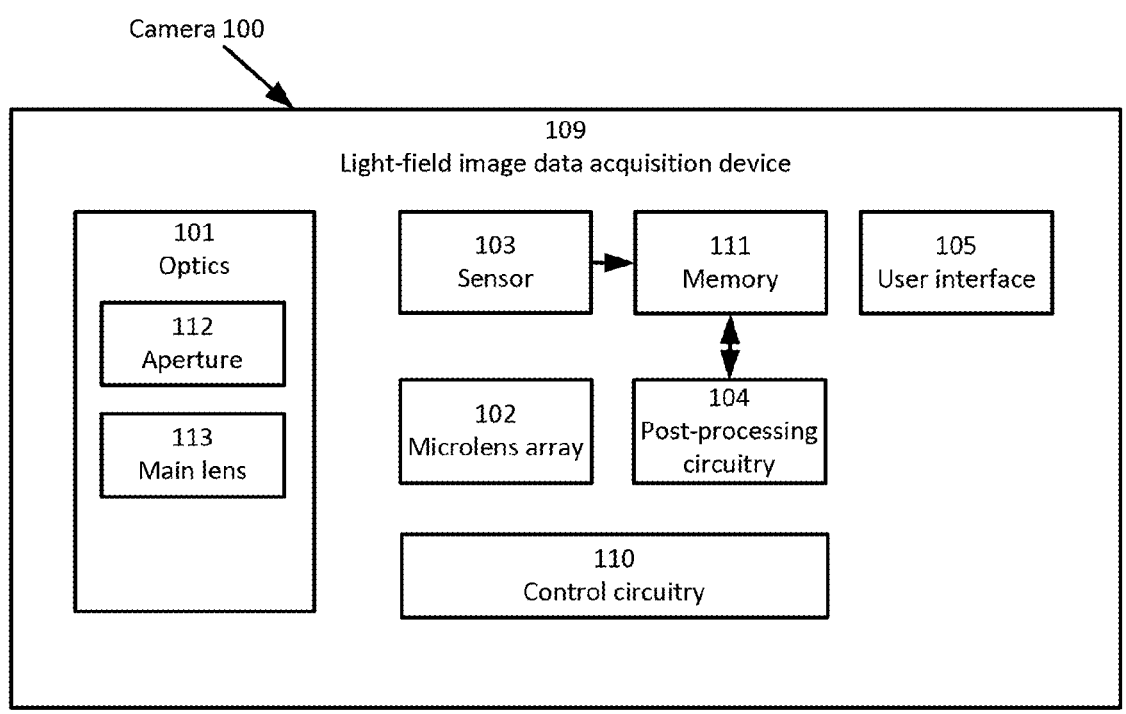
FIG. 1A depicts an example of an architecture for implementing the present invention in a light field capture device, according to one embodiment.

For purposes of the description provided herein, the following definitions are used:

Bayer Pattern: a particular 2×2 pattern of different color filters above pixels on a digital sensor. The filter pattern is 50% green, 25% red and 25% blue.

Disk: a region in a light field image that is illuminated by light passing through a single microlens; may be circular or any other suitable shape.

Image: a two-dimensional array of pixel values, or pixels, each specifying a color.

Light Field: a collection of rays. A ray's direction specifies a path taken by light, and its color specifies the radiance of light following that path.

Light Field Image: a two-dimensional image that spatially encodes a four-dimensional light field. The sensor image from a light field camera is a light field image.

Microlens: a small lens, typically one in an array of similar microlenses.

MLA: abbreviation for microlens array.

Pixel: an n-tuple of intensity values, with an implied meaning for each value. A typical 3-tuple pixel format is RGB, wherein the first value is red intensity, the second green intensity, and the third blue intensity. Also refers to an individual sensor element for capturing data for a pixel.

Representative Ray: a single ray that represents all the rays that reach a pixel.

Two-Dimensional Image (or Image): a two-dimensional array of pixels, each specifying a color. The pixels are typically arranged in a square or rectangular Cartesian pattern, but other patterns are possible.

Two-Dimensional Image Processing: any type of changes that may be performed on a two-dimensional image.

Vignetting: a phenomenon, related to modulation, in which an image's brightness or saturation is reduced at the periphery as compared to the image center.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light field data. Such a data acquisition device may include optics, sensors, and image processing electronics for acquiring data representative of a scene, using techniques that are well known in the art, are disclosed herein, or could be conceived by a person of skill in the art with the aid of the present disclosure.

One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for processing light field images are described. One skilled in the art will recognize that these various techniques and methods can be performed singly and/or in any suitable combination with one another.

Architecture

In at least one embodiment, the system and method described herein can be implemented in connection with light field images captured by light field capture devices including but not limited to those described in Ng et al., Light field photography with a hand-held plenoptic capture device, Technical Report CSTR 2005-02, Stanford Computer Science.

Figure 1B:
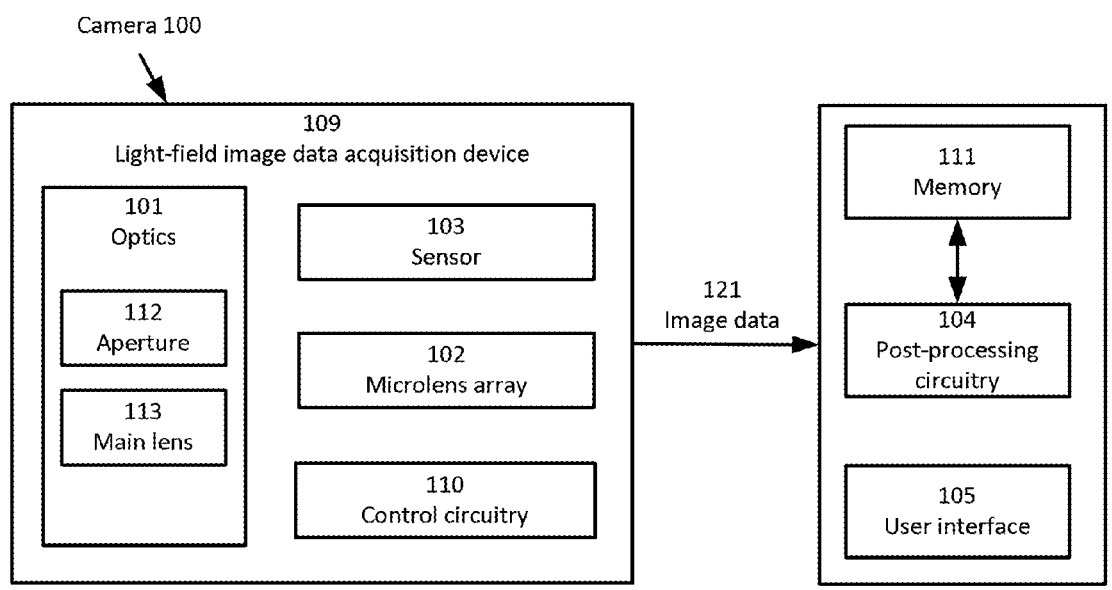
FIG. 1B depicts an example of an architecture for implementing the present invention in a post-processing system communicatively coupled to a light field capture device, according to one embodiment.

Referring now to FIG. 1A, there is shown a block diagram depicting an architecture for implementing the present invention in a light field capture device such as a camera 100. Referring now also to FIG. 1B, there is shown a block diagram depicting an architecture for implementing the present invention in a post-processing system communicatively coupled to a light field capture device such as a camera 100, according to one embodiment. One skilled in the art will recognize that the particular configurations shown in FIGS. 1A and 1B are merely exemplary, and that other architectures are possible for camera 100. One skilled in the art will further recognize that several of the components shown in the configurations of FIGS. 1A and 1B are optional, and may be omitted or reconfigured. Other components as known in the art may additionally or alternatively be added.

In at least one embodiment, camera 100 may be a light field camera that includes light field image data acquisition device 109 having optics 101, image sensor or sensor 103 (including a plurality of individual sensors for capturing pixels), and microlens array 102. Optics 101 may include, for example, aperture 112 for allowing a selectable amount of light into camera 100, and main lens 113 for focusing light toward microlens array 102. In at least one embodiment, microlens array 102 may be disposed and/or incorporated in the optical path of camera 100 (between main lens 113 and sensor 103) so as to facilitate acquisition, capture, sampling of, recording, and/or obtaining light field image data via sensor 103.

Figure 2:
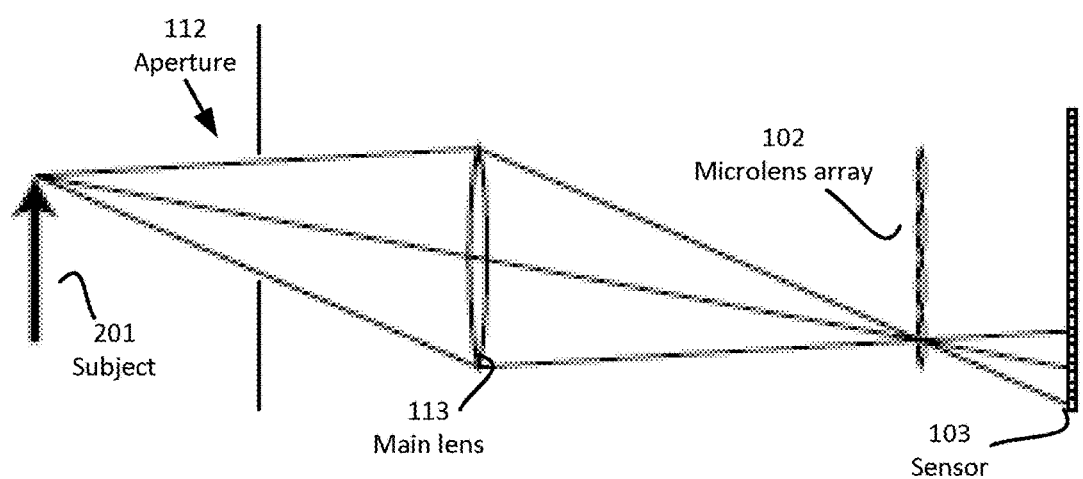
FIG. 2 depicts an example of an architecture for a light field camera for implementing the present invention according to one embodiment.

Referring now also to FIG. 2, there is shown an example of an architecture for a light field camera, or a camera 100, for implementing the present invention according to one embodiment. FIG. 2 is not shown to scale. FIG. 2 shows, in conceptual form, the relationship between aperture 112, main lens 113, microlens array 102, and sensor 103, as such components interact to capture light field data for subject 201.

In at least one embodiment, camera 100 may also include a user interface 105 for allowing a user to provide input for controlling the operation of camera 100 for capturing, acquiring, storing, and/or processing image data.

In at least one embodiment, camera 100 may also include control circuitry 110 for facilitating acquisition, sampling, recording, and/or obtaining light field image data. For example, control circuitry 110 may manage and/or control (automatically or in response to user input) the acquisition timing, rate of acquisition, sampling, capturing, recording, and/or obtaining of light field image data.

In at least one embodiment, camera 100 may include memory 111 for storing image data, such as output by sensor 103. The memory 111 can include external and/or internal memory. In at least one embodiment, memory 111 can be provided at a separate device and/or location from camera 100. For example, camera 100 may store raw light field image data, as output by sensor 103, and/or a representation thereof, such as a compressed image data file. In addition, as described in related U.S. Utility application Ser. No. 12/703,367 for "Light field Camera Image, File and Configuration Data, and Method of Using, Storing and Communicating Same," filed Feb. 10, 2010, memory 111 can also store data representing the characteristics, parameters, and/or configurations (collectively "configuration data") of field image data acquisition device 109.

In at least one embodiment, captured image data is provided to post-processing circuitry 104. Such processing circuitry 104 may be disposed in or integrated into light field image data acquisition device 109, as shown in FIG. 1A, or it may be in a separate component external to light field image data acquisition device 109, as shown in FIG. 1B. Such separate component may be local or remote with respect to light field image data acquisition device 109. The post-processing circuitry 104 may include a processor of any known configuration, including microprocessors, ASICS, and the like. Any suitable wired or wireless protocol can be used for transmitting image data 121 to processing circuitry 104; for example, the camera 100 can transmit image data 121 and/or other data via the Internet, a cellular data network, a Wi-Fi network, a Bluetooth communication protocol, and/or any other suitable means.

Overview of Light Field Image Capture

Light field images often include a plurality of projections (which may be circular or of other shapes) of aperture 112 of camera 100, each projection taken from a different vantage point on the camera's focal plane. The light field image may be captured on sensor 103. The interposition of microlens array 102 between main lens 113 and sensor 103 causes images of aperture 112 to be formed on sensor 103, each microlens in the microlens array 102 projecting a small image of main-lens aperture 112 onto sensor 103. These aperture-shaped projections are referred to herein as disks, although they need not be circular in shape.

Light field images include four dimensions of information describing light rays impinging on the focal plane of camera 100 (or other capture device). Two spatial dimensions (herein referred to as x and y) are represented by the disks themselves. For example, the spatial resolution of a light field image with 120,000 disks, arranged in a Cartesian pattern 400 wide and 300 high, is 400×300. Two angular dimensions (herein referred to as u and v) are represented as the pixels within an individual disk. For example, the angular resolution of a light field image with 100 pixels within each disk, arranged as a 10×10 Cartesian pattern, is 10×10. This light field image has a four-dimensional (x,y, u,v) resolution of (400,300,10,10).

Figure 3:
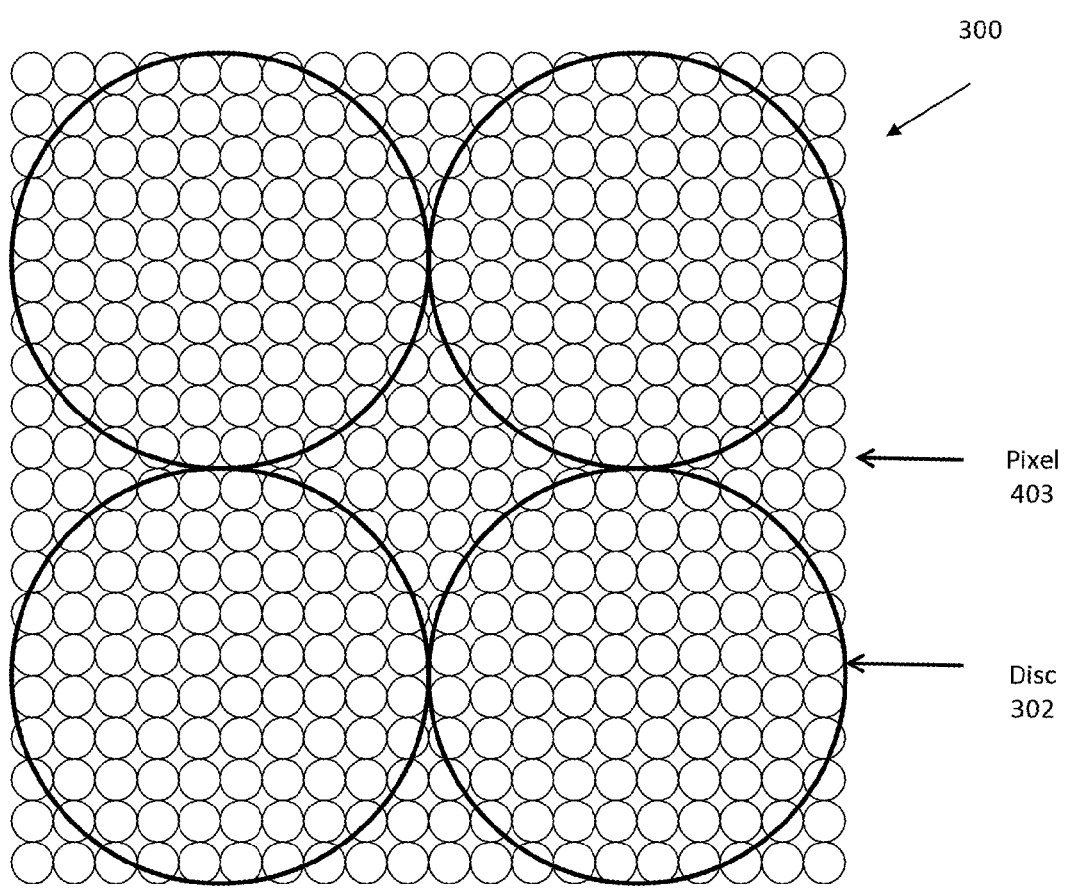
FIG. 3 depicts a portion of a light field image.

Referring now to FIG. 3, there is shown an example of a 2-disk by 2-disk portion 300 of such a light field image, including depictions of disks 302 and individual pixels 403; for illustrative purposes, each disk 302 is ten pixels 403 across. Many light rays in the light field within a light field camera contribute to the illumination of a single pixel 403.

Figure 4:
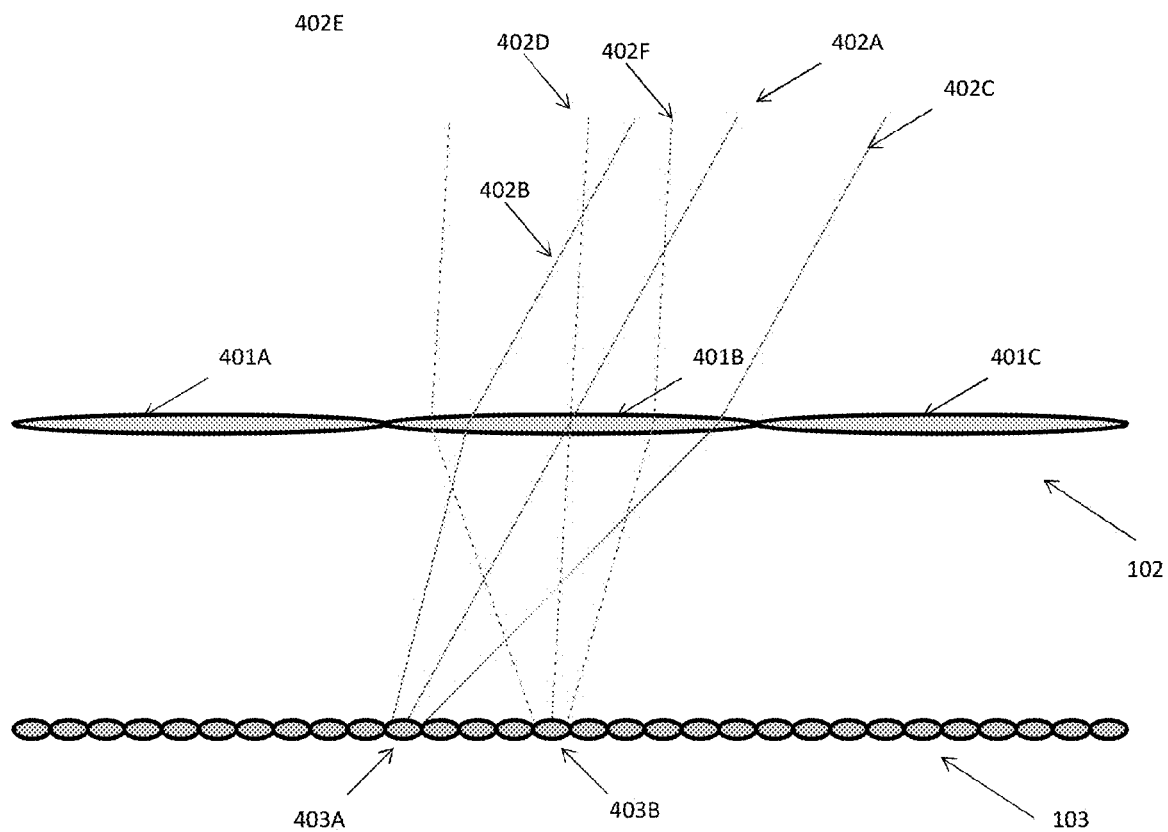
FIG. 4 depicts transmission of light rays through a microlens to illuminate pixels in a digital sensor.

Referring now to FIG. 4, there is shown an example of transmission of light rays 402, including representative rays 402A, 402D, through microlens 401B of the microlens array 102, to illuminate sensor pixels 403A, 403B in sensor 103. In the example of FIG. 4, rays 402A, 402B, 402C (represented by solid lines) illuminate sensor pixel 403A, while dashed rays 402D, 402E, 402F illuminate sensor pixel 403B. The value at each sensor pixel 403 is determined by the sum of the irradiance of all rays 402 that illuminate it. For illustrative and descriptive purposes, however, it may be useful to identify a single geometric ray 402 with each sensor pixel 403. That ray 402 may be chosen to be representative of all the rays 402 that illuminate that sensor pixel 403, and is therefore referred to herein as a representative ray 402. Such representative rays 402 may be chosen as those that pass through the center of a particular microlens 401, and that illuminate the center of a particular sensor pixel 403. In the example of FIG. 4, rays 402A and 402D are depicted as representative rays; both rays 402A, 402D pass through the center of microlens 401B, with ray 402A representing all rays 402 that illuminate sensor pixel 403A and ray 402D representing all rays 402 that illuminate sensor pixel 403B.

There may be a one-to-one relationship between sensor pixels 403 and their representative rays 402. This relationship may be enforced by arranging the (apparent) size and position of main-lens aperture 112, relative to microlens array 102, such that images of aperture 112, as projected onto sensor 103, do not overlap.

Figure 5:
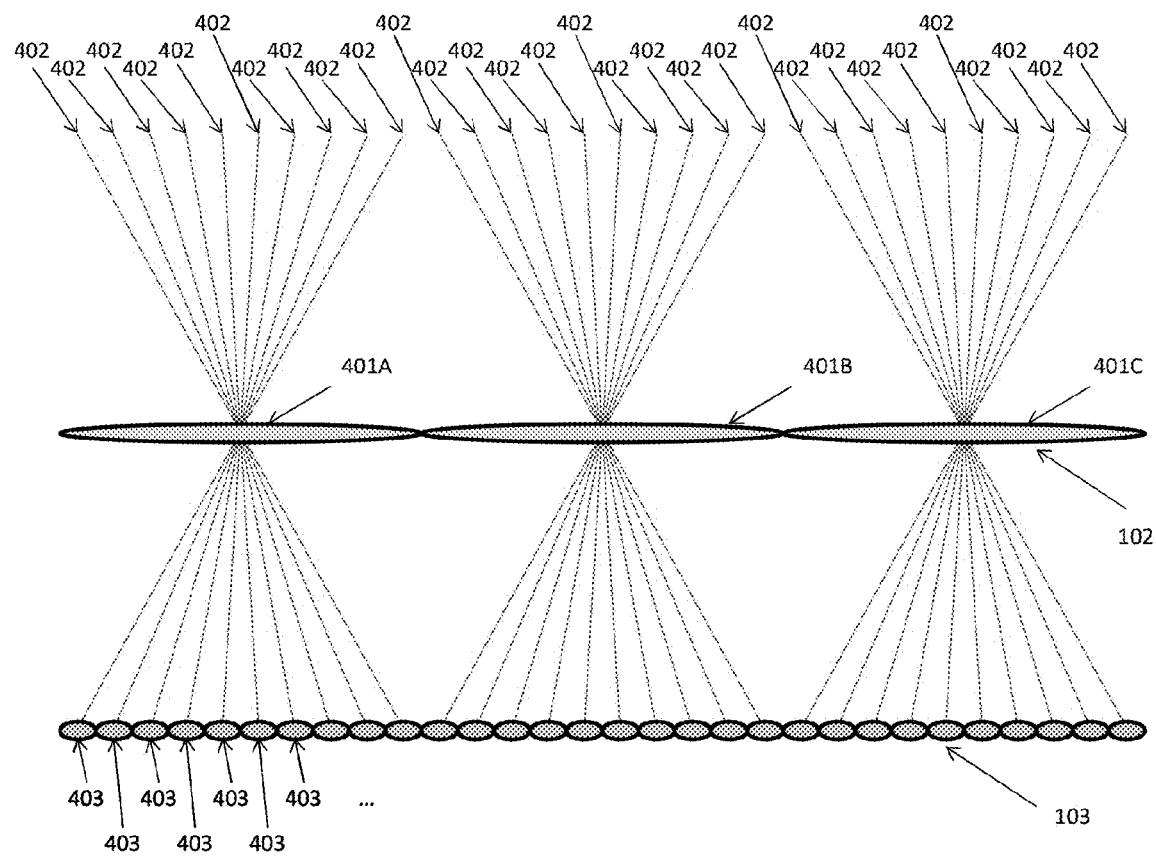
FIG. 5 depicts an arrangement of a light field capture device wherein a microlens array is positioned such that images of a main-lens aperture, as projected onto the digital sensor, do not overlap.

Referring now to FIG. 5, there is shown an example of an arrangement of a light field capture device, such as camera 100, wherein microlens array 102 is positioned such that images of a main-lens aperture 112, as projected onto sensor 103, do not overlap. All rays 402 depicted in FIG. 5 are representative rays 402, as they all pass through the center of one of microlenses 401 to the center of a pixel 403 of sensor 103.

In at least one embodiment, the four-dimensional light field representation may be reduced to a two-dimensional image through a process of projection and reconstruction.

Figure 6:
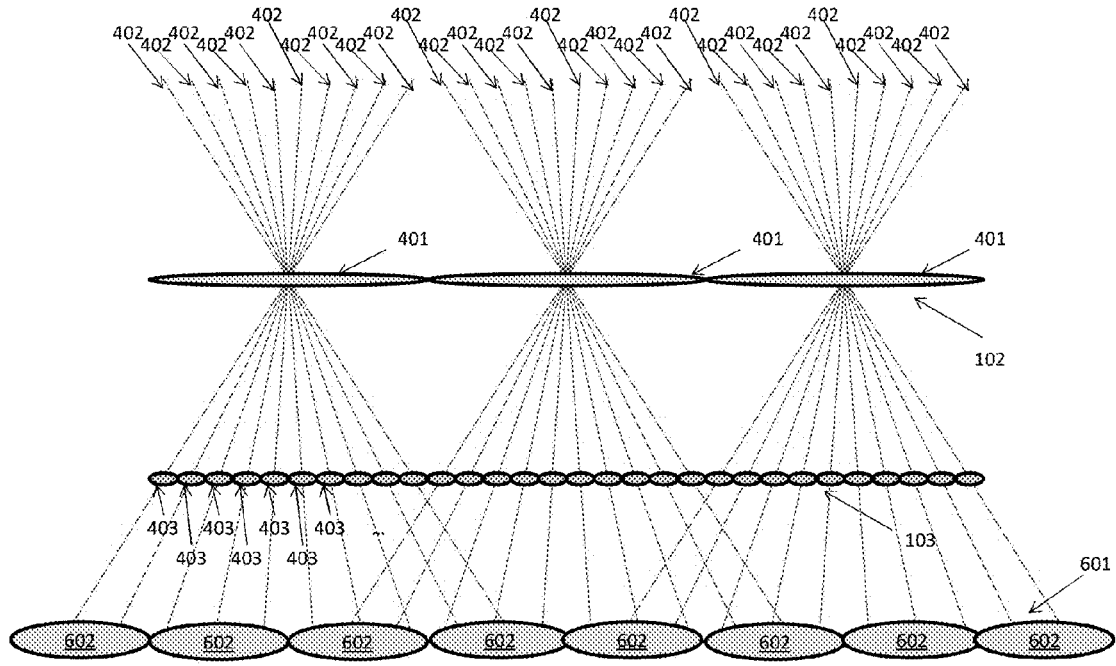
FIG. 6 depicts an example of projection and reconstruction to reduce a four-dimensional light field representation to a two-dimensional image.

Referring now to FIG. 6, there is shown an example of such a process. A virtual surface of projection 601 may be introduced, and the intersection of each representative ray 402 with surface 601 may be computed. Surface 601 may be planar or non-planar. If planar, it may be parallel to microlens array 102 and sensor 103, or it may not be parallel. In general, surface 601 may be positioned at any arbitrary location with respect to microlens array 102 and sensor 103. The color of each representative ray 402 may be taken to be equal to the color of its corresponding pixel. In at least one embodiment, pixels 403 of sensor 103 may include filters arranged in a regular pattern, such as a Bayer pattern, and converted to full-color pixels. Such conversion can take place prior to projection, so that projected rays 402 can be reconstructed without differentiation. Alternatively, separate reconstruction can be performed for each color channel.

The color of an image pixel 602 on projection surface 601 may be computed by summing the colors of representative rays 402 that intersect projection surface 601 within the domain of that image pixel 602. The domain may be within the boundary of the image pixel 602, or may extend beyond the boundary of the image pixel 602. The summation may be weighted, such that different representative rays 402 contribute different fractions to the sum. Ray weights may be assigned, for example, as a function of the location of the intersection between ray 402 and surface 601, relative to the center of a particular pixel 602. Any suitable weighting algorithm can be used, including for example a bilinear weighting algorithm, a bicubic weighting algorithm and/or a Gaussian weighting algorithm.

RAW Image Processing and Compression

This section describes exemplary systems and methods for compressing and decompressing RAW images that may achieve high compression ratios and also leverage commonplace, widely deployed image compression/decompression hardware that is designed to operate on full-color images.

RAW images may be characterized as being one or more of the following:

Images captured by a camera or other imaging device that features a color filter array (for example, color filter array with a Bayer mosaic pattern);

Images that contain a single value per pixel that corresponds to a single color (for example, red, green or blue)

The most common type of RAW image includes a repeating 2×2 grid pattern of pixels in which two are green, one is red, and one is blue; however, other RAW image layouts and/or formats exist, and are intended to also fall within the scope of the present invention.

Full-color images, such as RGB or YUV images, contain multiple (for example, 3) values per pixel, each value corresponding to a different color. Standard and/or commonplace image compression/decompression hardware is designed to compress full-color images by taking advantage of the fact that the human eye is more sensitive to certain aspects of full-color images than other aspects, and encoding those different aspects with greater or less precision accordingly. In at least one embodiment, RAW images are processed in such a way as to make them suitable for compression and decompression using such hardware, achieving higher compression ratios than are typically observed for RAW image compression while enabling highly efficient and fast compression and decompression implementations.

In certain embodiments, the inventions described and/or illustrated herein may be characterized as including one or more of the following components or aspects:

RAW image compression, comprising one or more of:

A technique for converting the RAW image pixel values, which are often represented by 10- to 16-bit numbers, to lower levels of precision, for example 8-bit values. This conversion may be performed in such a way as to minimize the overall precision loss in the RAW image, and to make use of the image data (for example, via an image histogram) to determine the mapping in a data-dependent fashion;

A rearrangement of the image data to map each RAW pixel, each of which has a single value, to a position in a full-color image, in which each pixel has multiple (for example, 3) values. Full-color images may be subsampled, resulting in a subsampled image in which each pixel only has a subset of the color channels of the full-color image, for example YUV422 images; and/or The compression of the rearranged data using a method that is designed to be employed on full-color images, for example JPEG compression or any other full-color image compression algorithm.

Storing and/or transferring the image while in this compressed form.

Associated metadata that describes the compression process may be stored and/or transmitted along with the compressed image data, for example tables that describe the mapping between the original-precision and the low-precision pixel encodings.

RAW image decompression, comprising one or more of:

The decompression of the compressed image data using a respective complementary full-color decompressor, for example a JPEG decompressor if a JPEG compression algorithm was used to compress the image;

The rearrangement of the image data to invert the mapping performed during compression, that is, to map the pixel values from their positions in the full-color image back to their positions in the RAW image; and/or The conversion of each pixel value from its low-precision encoded form (for example, 8 bits per pixel) back to its original precision (for example, 10 to 16 bits per pixel). The conversion may include the dithering of each pixel value by adding a randomly selected amount from within a range that is chosen to take into account some or all of the following information, or any other information:

The magnitude of the pixel value; or

The mapping used to convert between the original precision and the low-precision encoded pixel values.

Existing image compression algorithms are mostly related to full-color image compression, and achieve high compression ratios by lossy encodings that exploit the human eye's varying sensitivity to different image aspects. The inventions described and/or illustrated herein may enable such full-color image compression techniques to be brought to bear on RAW images and in particular RAW light field images, thus enabling highly efficient and fast hardware that implements such full-color image compression algorithms to be used to compress RAW images. Some or all of the techniques described herein can be applied to light field images in RAW format or in other formats.

Encoding RAW Pixel Values Using Less Precision

In certain aspects, the invention described herein relates to a method of encoding pixels in RAW images using less per-pixel precision. For example, RAW image pixels are often represented by values that span a 10-bit to 16-bit range (corresponding to numbers in the ranges [0,1023] to [0,65535], respectively), and the method described herein may transform the RAW pixel values into an encoding that requires less precision, for example an 8-bit value (corresponding to a number in the range [0,255]). Specific embodiments may transform pixel values between any RAW precision and any lesser encoded precision; the description is not intended to be limited to the exemplary precisions described and/or illustrated herein.

Various alternative methods may be employed to implement this conversion, for example:

Dividing or "right-shifting" each pixel value by the appropriate amount, for example right-shifting the values by 2 bits when converting from a 10-bit RAW pixel value to an 8-bit encoded value. A variation of this method may involve first adding an amount to the RAW value prior to dividing or shifting it, and in general, adding an amount roughly equal to half of the divisor will prevent this method from introducing an intensity bias in the resultant image, for example slightly darkening it.

Creating one or more lookup tables that are indexed by RAW pixel values and map them to encoded values. For example, when converting from 10-bit RAW pixel values to 8-bit encoded values, such a lookup-table may have 1024 entries, each containing a value in the range [0,255]. There may be a single lookup table that is used for all RAW pixel values, or there may be multiple lookup tables, for example a separate lookup table dedicated to each of the different colors that a RAW pixel value may correspond to (for example red, green, and blue).

Various alternative methods may in turn be used to create such lookup tables, for example:

Evenly spacing the encoded values across the entire RAW pixel value range (for example as depicted in FIG. 7A for an example 3-bit to 2-bit conversion).

Spacing the encoded values in a non-evenly-spaced fashion (for example, as depicted in FIG. 7B). In this case, there is great latitude in the decision of which spacing to use, and the choice of spacing may play a large role in the final quality of the overall compression process.

One approach for generating a non-evenly-spaced lookup-table may be to examine the RAW image data itself. Based on an analysis of the RAW image data, the system can determine the spacing that produces the best output, measured (for example) with respect to some overall quantitative error metric (for example, RMS error), or with respect to a qualitative estimate of image quality degradation resulting from the compression and decompression processes.

One exemplary implementation of generating a lookup-table based on an analysis of the RAW image data is as follows:

1. Build a separate histogram of the RAW pixel values for each RAW color; for example, for a RAW image in which pixel values could be red, green, or blue, 3 histograms would be built, one per color. Each histogram has as many entries as there are possible RAW pixel values for its color. For example, if red RAW pixel values are 10-bit binary values, then the red histogram has $2^{10}=1024$ entries.

Figure 8:
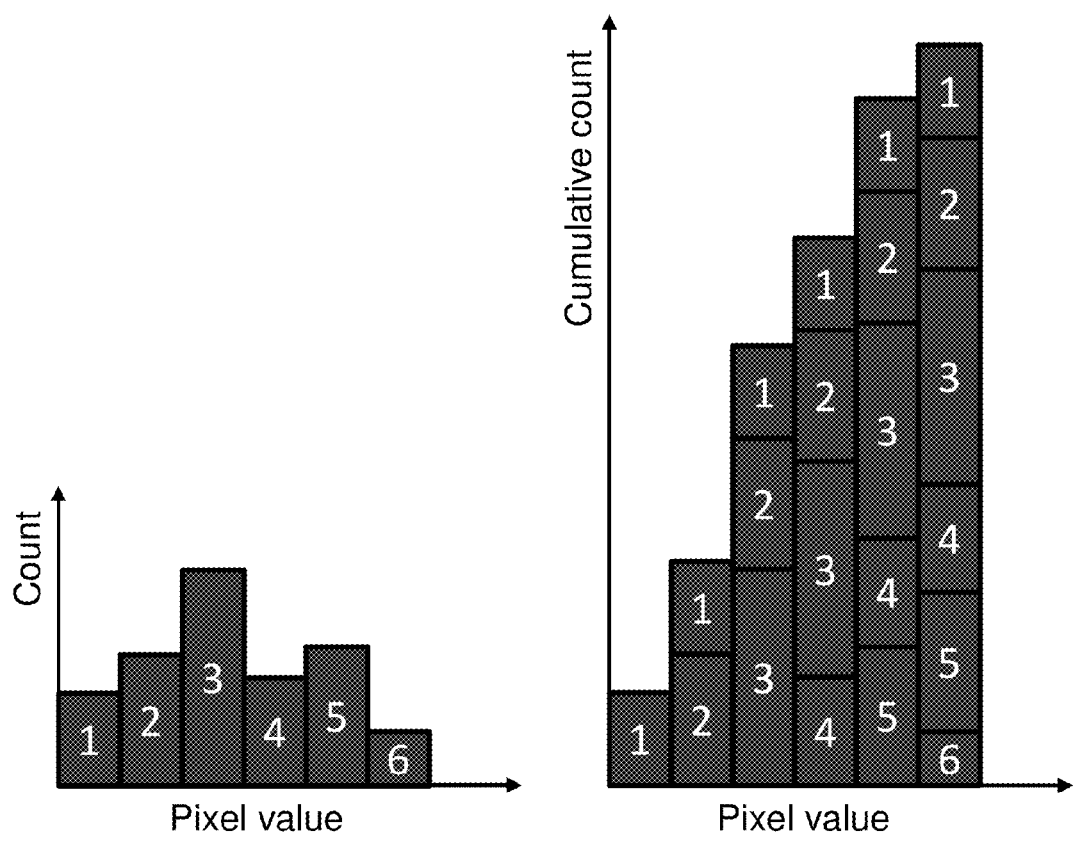
FIG. 8 depicts an exemplary image histogram with a corresponding cumulative histogram.

2. For each histogram, build a corresponding cumulative histogram, as illustrated in FIG. 8.

3. For each histogram, compute a single "span" for the entire histogram. For each of these spans, assign to it a metric value corresponding to the product of the total sum of pixel values within it and the span's width as follows (where a is the minimum pixel value (0), and b is the maximum pixel value, for example 255 if 8-bit encoded pixel values are being used):

metric[span $a{:}b$]=(SUM[$i{=}a$ to $b$]histogram[$i$])*($b{-}a$)

This may be computed efficiently by using the cumulative histogram:

metric[span $a{:}b$]=(cumulativeHistogram[$b$]−cumulativeHistogram[$a$])*($b{-}a$)

Figure 9A:
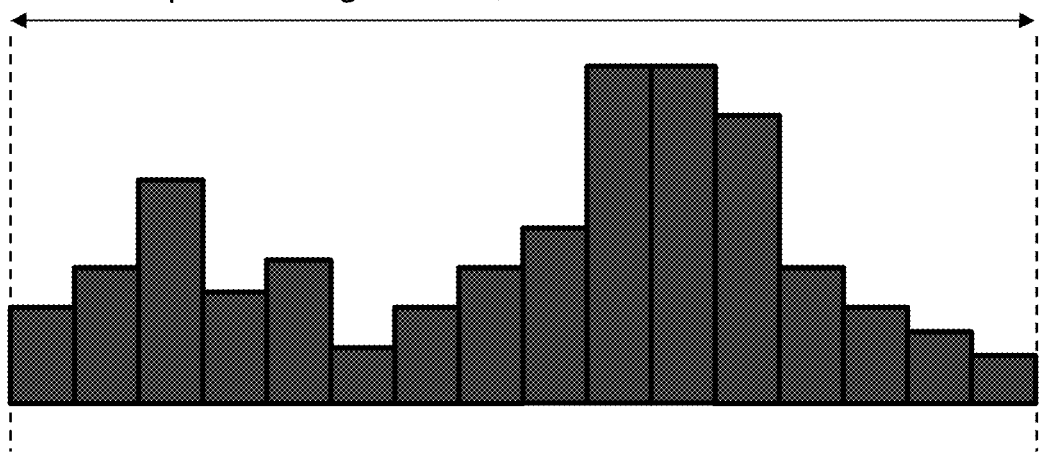
FIG. 9A depicts a histogram for an initial state, in which a single span encompasses the entire histogram.
Figure 9B:
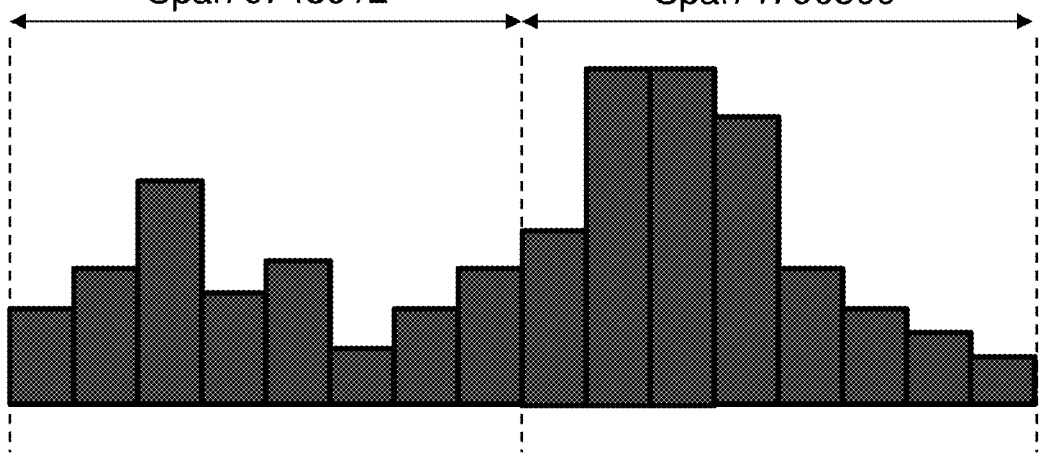
FIG. 9B depicts the histogram of FIG. 9A after one step, showing the final metric values for each of two spans.
Figure 9C:
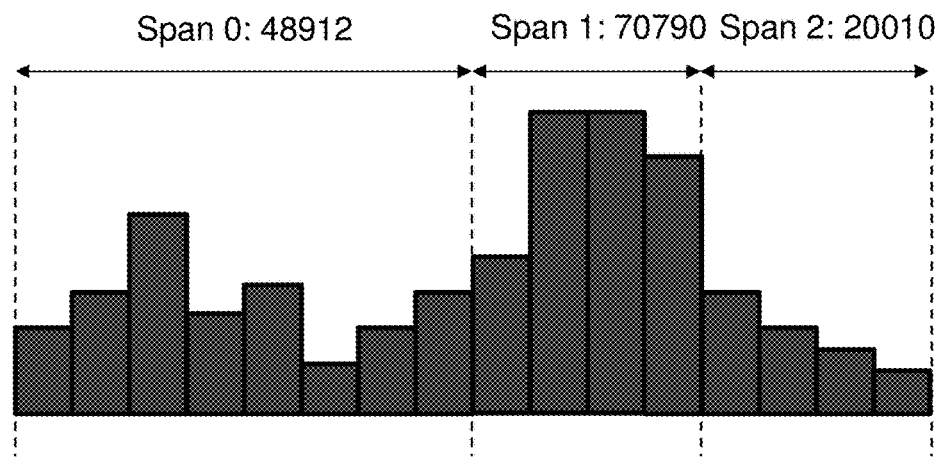
FIG. 9C depicts the histogram of FIG. 9A after two steps, showing the final metric values for each of three spans.
Figure 9D:
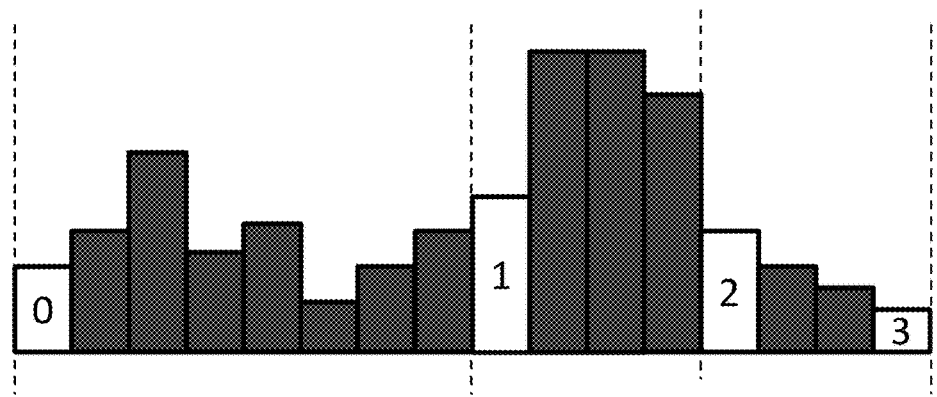
FIG. 9D depicts the selection of four pixel values spaced across the full range of pixel vales of the histogram of FIG. 9A.

4. For an encoded value precision of N-bits, there are $2^N$ lookup values; for example, for an 8-bit encoded value range, the lookup table will map RAW pixel values to one of $2^8=256$ numbers (that is, numbers in the range [0,255]). Iteratively perform the following $2^N{-}2$ times:

a. Choose the span with the largest metric value.
b. Split that span in half, by removing it and creating two new spans, each covering half of the RAW pixel values. This step is illustrated in the transitions between FIGS. 9A-9B, and FIGS. 9B-9C. Each new span is assigned a new metric, using the same formula listed above.

Figures 10A, 10B:
FIGS. 10A and 10B depict the use of four seed values in an exemplary four-bit to two-bit conversion lookup table to populate the remainder of the lookup table.

5. For all $2^N-1$ spans, use the "start" value of the span as one of the RAW pixel values to "seed" the lookup table: mark each table entry as unmapped, and then fill in the $2^N-1$ table entries that are indexed by the $2^N-1$ span start values with an increasing sequence of numbers that covers the numeric range of the target encoded precision (for example) the numbers 0 through 254 in the case of encoding to an 8-bit precision. The "end" value of the last span is also used to seed the lookup table by filling in the last table entry with the highest number representable in the target precision (for example) 255 in the case of 8-bit precision. For the example 4-bit to 2-bit conversion illustrated in FIGS. 9A-9D, FIG. 9D depicts the span endpoints used to seed the lookup table, and FIG. 10A shows the resultant table.

6. Populate the remaining entries of the lookup table according to the nearest seed value, for example as illustrated in FIG. 10B.

Once this process is complete, the per-color lookup tables may be used to convert the RAW pixel values to encoded pixel values by using the RAW pixel value to index the table corresponding to its color (for example, red, green, or blue):

encodedValue[x,y]=lookupTable[rawValue[x,y]]

Other algorithms for determining the lookup tables from the raw image data are possible, for example annealing-based approaches to choosing the histogram spans.

Rearranging RAW Image Data into a Full-Color Image Layout

In at least one embodiment, image data is rearranged from a RAW image layout to a full-color image layout. For example, RAW images may include pixels consisting of a single value corresponding to a single color, while full-color images may include pixels consisting of multiple values corresponding to multiple colors.

Figures 11A, 11B:
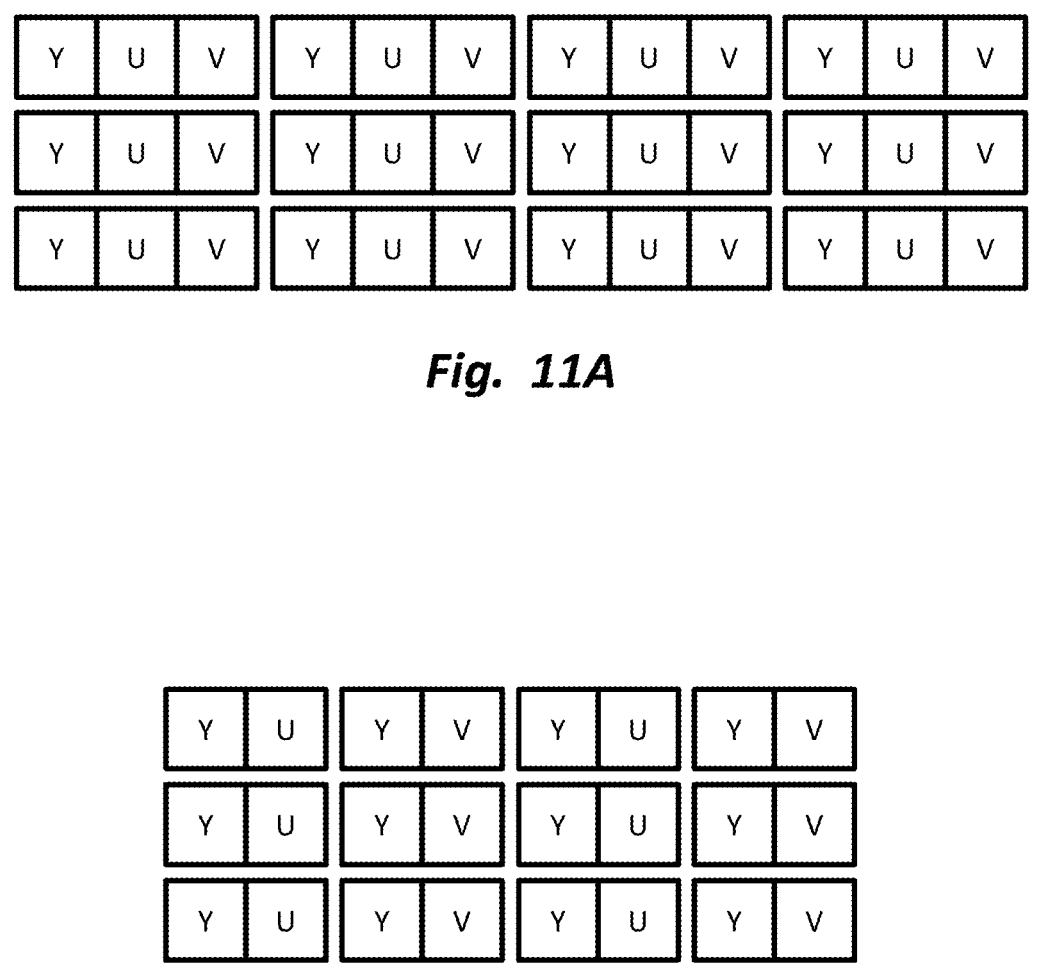

FIGS. 11A and 11B illustrate two different full-color image layouts: YUV and YUV422. In the case of FIG. 11A, each pixel consists of three values (Y, U, and V), while in the case of FIG. 11B, each pixel consists of two values, either (Y, U) or (Y, V), where Y is the luma and U,V are the chroma channels. Note that YUV422 images are sub-sampled versions of YUV images: both are used to describe full-color images, but the YUV422 image stores half as many chroma values as the YUV images do.

Figure 12:
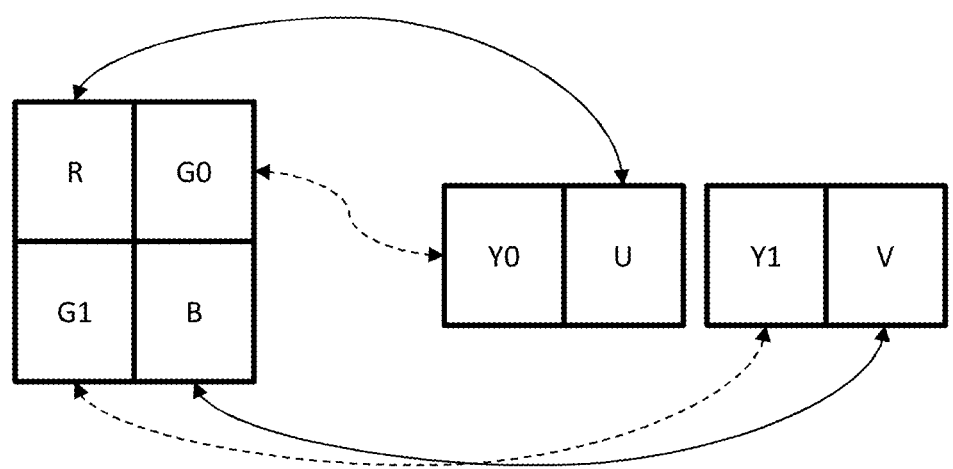
FIG. 12 depicts the mapping between a 2×2 grid of RAW image pixels and a 2×1 grid of YUV422 full-color image pixels.
Figure 13:
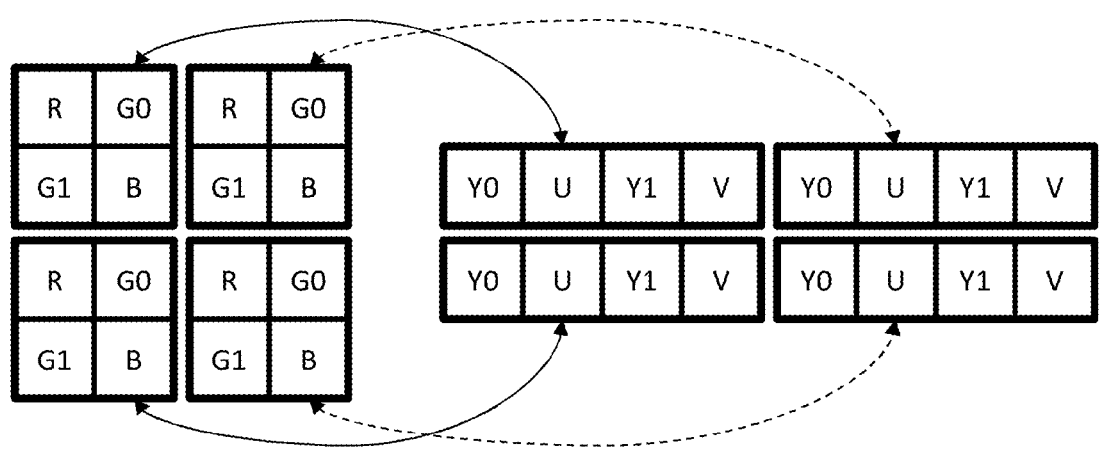
FIG. 13 depicts the mapping between a 4×4 grid of RAW image pixels and a 4×2 grid of YUV422 full-color image pixels.

FIGS. 12 and 13 are an illustrative example of mapping from an exemplary Bayer-like RAW image layout to a YUV422 full-color image layout. Each RAW pixel consists of a single color value (either R, G0, G1, or B, where G0 and G1 are both green). In this mapping, a 2×2 grid of four RAW pixels is mapped to a 2×1 grid of YUV422 full-color pixels. Note that 4 RAW pixels, each consisting of 1 value, are mapped to 2 YUV422 pixels, each consisting of 2 values, so the net effect is that 4 RAW pixel values are mapped to 4 YUV422 image values. Note also that the 2×2 grid of values is mapped to a 4×1 grid of values, in the YUV422 image layout.

This exemplary rearrangement is chosen due to the fact that there is a mapping from a 2×2 grid of pixels in this particular RAW layout (comprising one red, one blue, and two green values) to a 2×1 grid of YUV422 pixels (comprising one U, one V, and two Y values) that satisfies the following two constraints:

1. Pixels that are nearby in one layout are also nearby in the alternate layout, preserving local image properties such as features/edges that the image compression and decompression processes may take into account.
2. Pixel value color relationships are preserved, in that by mapping R→U, B→V, and G→Y, the property that the two G pixels in the 2×2 RAW pixel grid are of the same color channel is preserved as they are mapped to two Y values in the YUV422 full-color image layout.

This exemplary rearrangement transforms a RAW image of dimensions width W by height H into a YUV422 image of dimensions W by H/2, where each YUV422 image pixel consists of 2 values. Thus, each layout represents the image using a total of W*H pixel values.

Note that a mapping and/or rearrangement may be defined between any RAW layout and any full-color image layout; the description herein is not intended to be limited to Bayer-like RAW image layouts and YUV422 full-color image layouts.

Compressing RAW Image Data in a Full-Color Image Layout

Figure 14A:
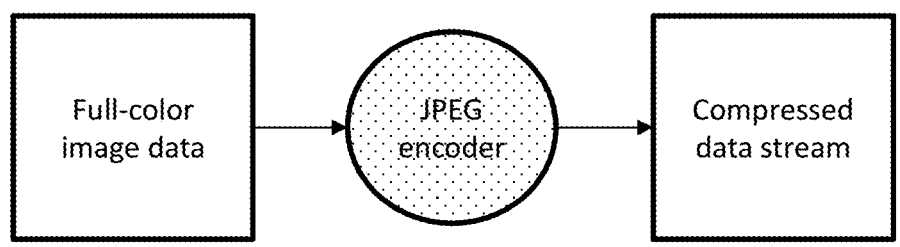
FIG. 14A depicts compression of a YUV422 image buffer to a JPEG data stream.
Figure 14B:
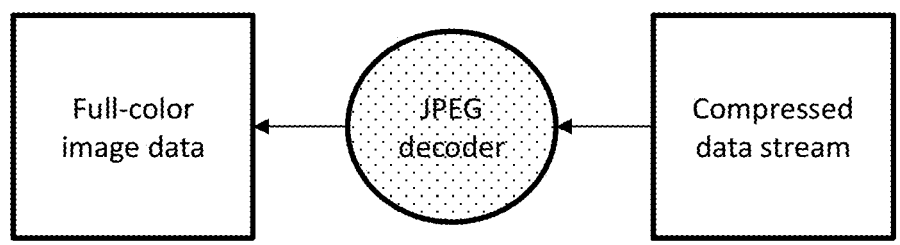
FIG. 14B depicts decompression of a YUV422 image buffer from a JPEG data stream.

In at least one embodiment, the present invention includes a method of compressing a RAW image that has been represented as a full-color image. In one embodiment, as illustrated in FIG. 14A, the RAW image is represented as a YUV422 image as described herein, a standard JPEG encoder is used to compress the YUV422 image data into a compressed data stream. In at least one embodiment, the method of the present invention may utilize existing highly efficient and fast hardware implementations of such JPEG encoders. Decompression of the data stream into YUV422 image data is shown in FIG. 14B.

Storing and/or Transmitting Compressed RAW Image Data

Figure 15:
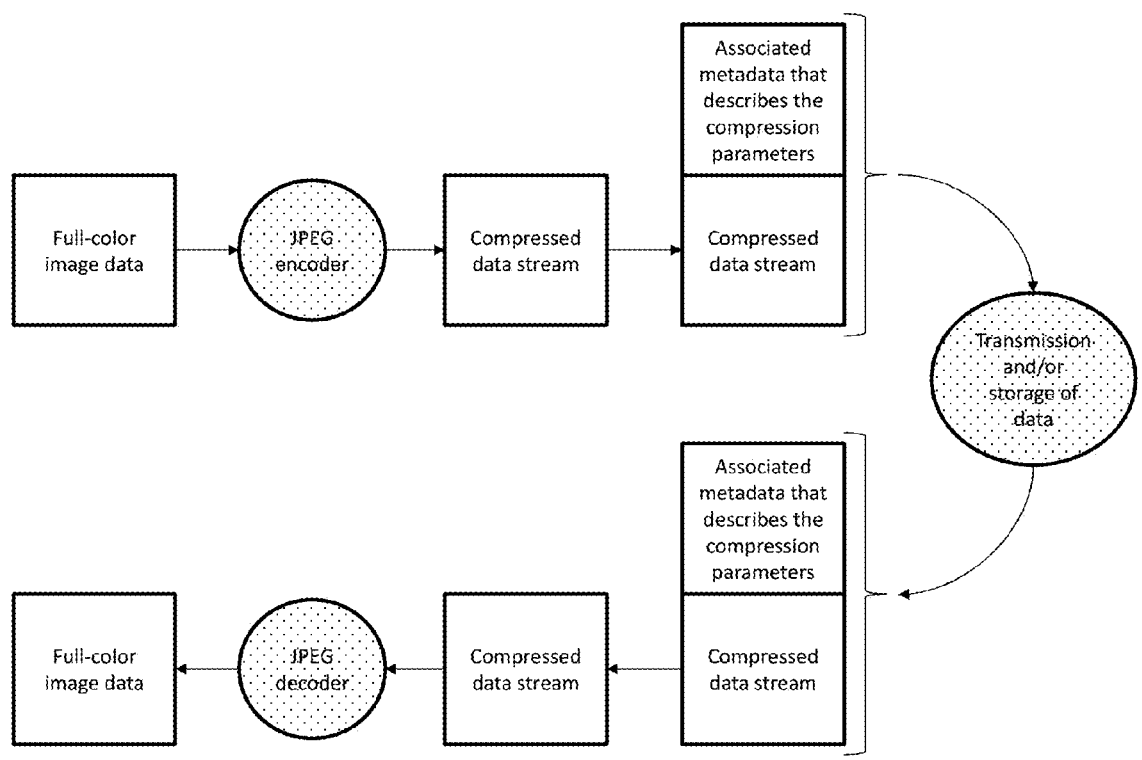
FIG. 15 depicts JPEG encoding and decoding in schematic form.

In at least one embodiment, the present invention includes a method of storing and/or transmitting data that has been encoded and/or compressed via the techniques described herein. FIG. 15 depicts one exemplary embodiment, in which some associated metadata that describes the encoding and/or compression is stored and/or transmitted alongside the compressed image data. Such associated metadata may include, for example, one or more of:

The lookup table(s) used to convert between the original RAW precision and the lower-precision RAW pixel values;

Information describing any pixel data rearrangement that was performed; and/or

Information describing the compression that was performed, including any parameters that were used.

Any associated metadata may be used when the compressed image data is loaded and/or received; such metadata can be used to decompress, decode, and otherwise process the image data.

Decompressing RAW Image Data in a Full-Color Image Layout

In at least one embodiment, the present invention includes a method of decompressing image data that has been compressed by the techniques described herein. FIG. 14B depicts an example of image decompression wherein JPEG decoding is used. In general, the method of decompressing compressed image data uses a complementary method to that which was used to compress the image data.

Just as there exist highly fast and efficient hardware image compressors that are designed to operate on full-color images, there also exist complementary hardware decompressors for compressed full-color images. Various embodiments of the present invention permit the exploitation of such existing hardware decompressors to rapidly decompress raw image data that has been encoded and compressed as described herein.

Rearranging RAW Image Data from a Full-Color Image Layout

In at least one embodiment, the present invention includes a method of rearranging the pixel values from a full-color image layout back to the RAW image layout corresponding to the original RAW image, as illustrated in FIGS. 12 and 13 for the example of a YUV422 full-color image layout and a Bayer RAW image layout. This rearrangement is complementary to the rearrangement done when the image was compressed, as described herein.

Converting Low-Precision-Encoded RAW Pixel Values to Higher-Precision Values In at least one embodiment, the present invention includes a method of converting low-precision-encoded pixel values in a decompressed image to higher precision pixel values, for example to the original precision of the uncompressed RAW image. Given the lookup tables used to encode each RAW pixel value (for example, one lookup table per RAW image color channel), an inverse lookup table may be created that maps the encoded values to their original values, for example as illustrated in FIG. 16. Such an inverse lookup table may be created from the original lookup table by averaging all of the RAW image pixel values (i.e. lookup table indices) that map to the same encoded pixel value.

An equation that may be used to apply the inverse lookup table to the lower-precision-encoded RAW image to derive the higher-precision RAW image is as follows:

rawValue[x,y]=inverseLookupTable[encodedValue[x,y]]

An alternate equation may incorporate dithering during the decoding process, as follows:

rawValue[x,y]=CLAMP[inverseLookupTable[encodedValue[x,y]]+randomValue]

where the random value is selected randomly from a range of possible values which may be predetermined, may be dependent on the RAW pixel value, and/or may be dependent on the lookup tables in use. An exemplary method of selecting the random value for dithering is to randomly select it from the RAW pixel value range between adjacent entries in the inverse lookup table; such a technique will dither the decoded pixel values by an amount that is related to the precision that was lost when converting the RAW pixel value to its lower-precision value during the compression procedure described herein. In at least one embodiment, after adding the random value, the method clamps the resultant RAW pixel value to be within some specified RAW pixel value range.

By way of explanation using the example of FIG. 16, supposing the 2-bit encoded value was "0", the resultant RAW value would be determined as "1", and a dithering amount randomly selected from the range [−2,+2] could be added, since 2 is the largest value that can be added without the pixel value becoming an adjacent value in the inverse lookup table (i.e. "4" in this example).

Light Field Image Compression

Light field images present unique challenges for image compression. In addition to the challenges mentioned above in connection with RAW images, RAW light field images tend to have a high degree of spatial variation in pixel intensity. This will be shown and described in connection with FIGS. 17A and 17B, as follows.

Figure 17A:
FIG. 17A depicts a RAW light field image.

FIG. 17A depicts a RAW light field image 1700. The RAW light field image may be formed of a plurality of pixel clusters, each of which encodes a portion of the light field data corresponding to a microlens of the microlens array. More precisely, each pixel cluster may correspond to the portion of the sensor 103 that receives light from a single microlens 401 of the microlens array 102. Thus, each pixel cluster may be comparable to the disks 302 of FIG. 3. The pixel clusters are too small to be visible in the RAW light field image in the scale of FIG. 17A.

Figure 17B:
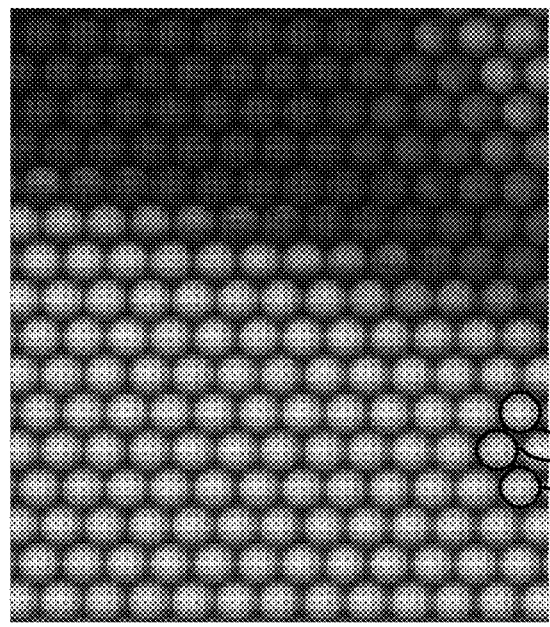
FIG. 17B depicts an enlarged portion of the RAW light field image of FIG. 17A, illustrating the pixel clusters of the RAW light field image.

FIG. 17B depicts an enlarged portion 1750 of the RAW light field image of FIG. 17A, illustrating the pixel clusters 1760 of the RAW light field image. Each pixel cluster 1760 may be generally circular, and may have a plurality of pixel rows and pixel columns that define a grid pattern. The pixels of each pixel cluster 1760 may be color-specific since they may embody the mosaic pattern of raw output from the microlens array 102, such as a Bayer pattern. Thus, the pixels of each pixel cluster may include, for example, a plurality of 2×2 mosaics, each of which includes red, green, and blue pixels.

One of the challenges of compressing a light field image may be the high degree of pixel intensity spatial variation present in the image. As shown in FIG. 17B, each of the pixel clusters 1760 may display vignetting, which is a phenomenon in which an image's brightness or saturation is reduced at the periphery as compared to the image center. Accordingly, each of the pixel clusters 1760 may represent a transition from low intensity (at, for example, the left edge of the pixel cluster 1760) to high intensity (in the center of the pixel cluster 1760) and back to low intensity again (at, for example, the right edge of the pixel cluster 1760). Many image compression algorithms may effectively group adjacent pixels of similar intensity and/or hue together to compress the image; thus, the vignetting present in the light field image may interfere with and/or prevent effective compression of the image with known image compression techniques, when applied alone.

The present invention may provide mechanisms for compressing two-dimensional images projected from light field data that overcome these challenges. In some embodiments, this may be done through the performance of additional image processing steps in addition to application of an image compression algorithm. These steps will be shown and described in connection with FIG. 18.

Figure 18:
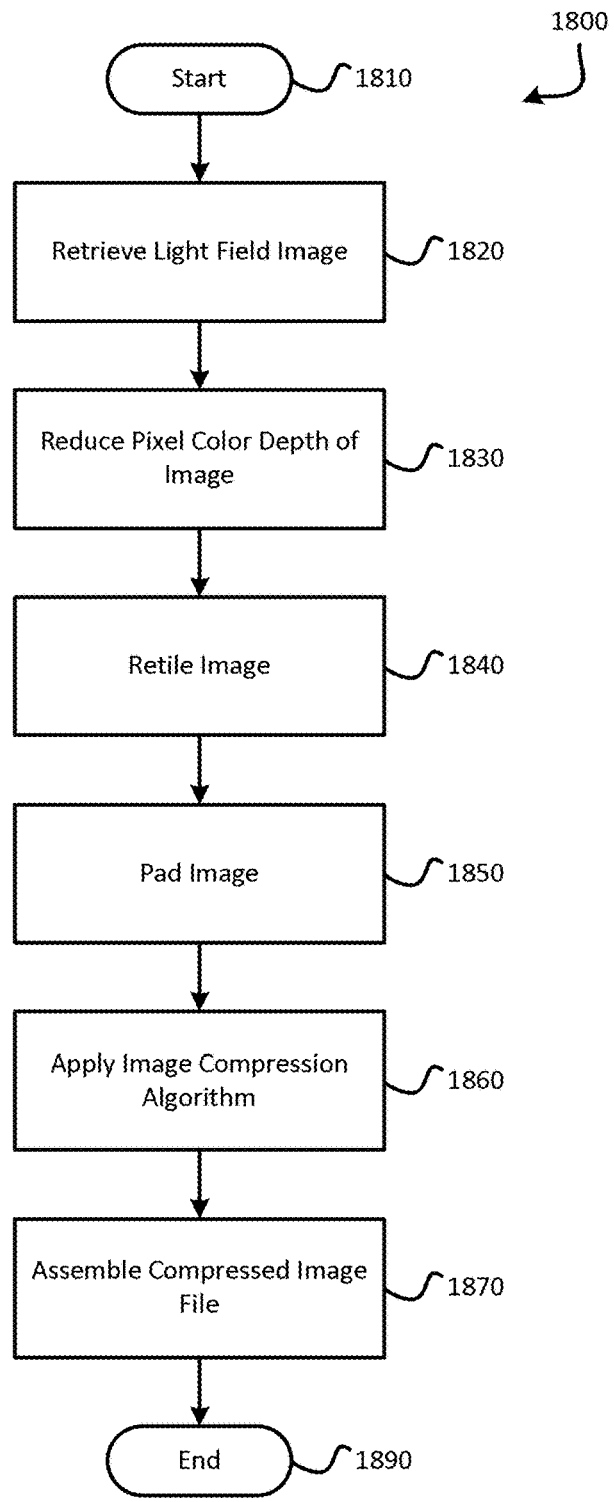
FIG. 18 depicts a method for compressing an image projected from light field data, according to one embodiment of the invention.

FIG. 18 depicts a method 1800 for compressing an image projected from light field data, according to one embodiment of the invention. The method 1800 may be carried out by the camera 100, a separate post-processing system connected to the camera 100, by a computing device independent of the camera 100, or the like. Such a computing device (not shown) may have components such as one or more processors, memory blocks, user interface elements, and/or other computing device components known in the art.

The light field image may be a RAW image as described previously, or may be encoded in a different format. If the light field image is a RAW image, it may be a Bayer pattern mosaic image (RGGB), and may thus have groups of 2×2 pixels, each of which has an intensity obtained from light filtered through red, green, or blue filters. Alternatively, the light field image may have other color mosaic patterns such as an RGBE, CYYM, CYGM, or RGBW pattern.

The method 1800 may start 1810 with a step 1820 in which the light field image is retrieved, for example, from the camera 100, the memory 111, and/or any other data storage system. Once the light field image has been retrieved, the method 1800 may proceed to a step 1830 in which the color depth of the pixels of the light field image is reduced. Color depth reduction may entail reduction of the number of bits required to encode each pixel. Some image compression algorithms may operate more effectively on images with a certain color depth, such as 8 bits. Thus, if desired, the step 1830 may reduce the color depth of the pixels of the light field image from their native color depth, which may be 12 or 16 bits, to 8 bits. Exemplary color depth reduction methods will be shown and described in connection with FIG. 19.

Once the pixel color depth of the light field image has been reduced, the method 1800 may proceed to a step 1840 in which the light field image is retiled. Retiling may entail moving pixels from pixel clusters, each of which pertains to one microlens 401 of the microlens array 102, to a retiled pixel cluster in which the pixels are generally grouped by color and/or intensity. The step 1840 may thus help overcome the challenges posed by the relatively high pixel intensity spatial variation of the light field image, as described above. Accordingly, the step 1840 may also enhance performance of the image compression algorithm to be applied subsequently. Exemplary retiling methods will be shown and described in connection with FIG. 20, with exemplary results shown in FIGS. 21A and 21B.

Once the step 1840 is complete, the method 1800 may proceed to a step 1850 in which the retiled image is padded. Padding the image may involve adding one or more pixel rows and/or pixel columns to the image so that it is the appropriate size for application of the image compression algorithm. Some image compression algorithms break up the subject image into tiles for processing. Such image compression algorithms may function more effectively if the subject image already has a number of pixel rows and pixel columns that are both integer multiples of the number of pixel rows and pixel columns of each tile the image compression algorithm is designed to process. For example, JPEG image compression algorithms may process tiles of 16×8 pixels or 8×8 pixels.

The added pixel rows and/or pixel columns may be duplicates of the adjacent edge a pixel column and/or edge pixel row. Exemplary padding methods will be shown and described in connection with FIG. 22.

After completion of the step 1850, the method 1800 may proceed to a step 1860 in which an image compression algorithm is applied to the padded image. Applying the image compression algorithm to the image may entail applying a known lossless or lossy image compression algorithm such as that developed by the Joint Photographic experts Group, known as "JPEG" compression. Other formats may be used, including but not limited to JPEG 2000, EXIF, TIFF, GIF, WEBP, and the like. Additionally or alternatively, application of the image compression algorithm may entail application of one or more novel techniques for compressing an image, as described above in connection with FIGS. 7A through 16. The image compression algorithm may be applied to the retiled image. The performance of the image compression algorithm may be enhanced by the color depth reduction, retiling, and/or padding steps performed previously.

After the step 1860 has been performed, the method 1800 may proceed to a step 1870 in which the compressed image file is assembled. This may be done by combining the compressed image with metadata. The metadata may include a variety of items such as camera parameters and information regarding the steps performed in the method 1800, which may help in further processing and/or decompression of the compressed image file. The step 1870 will be shown and described in greater detail in connection with FIG. 23. After completion of the step 1870, the method 1800 may end 1890.

Bit Reduction

Figure 19:
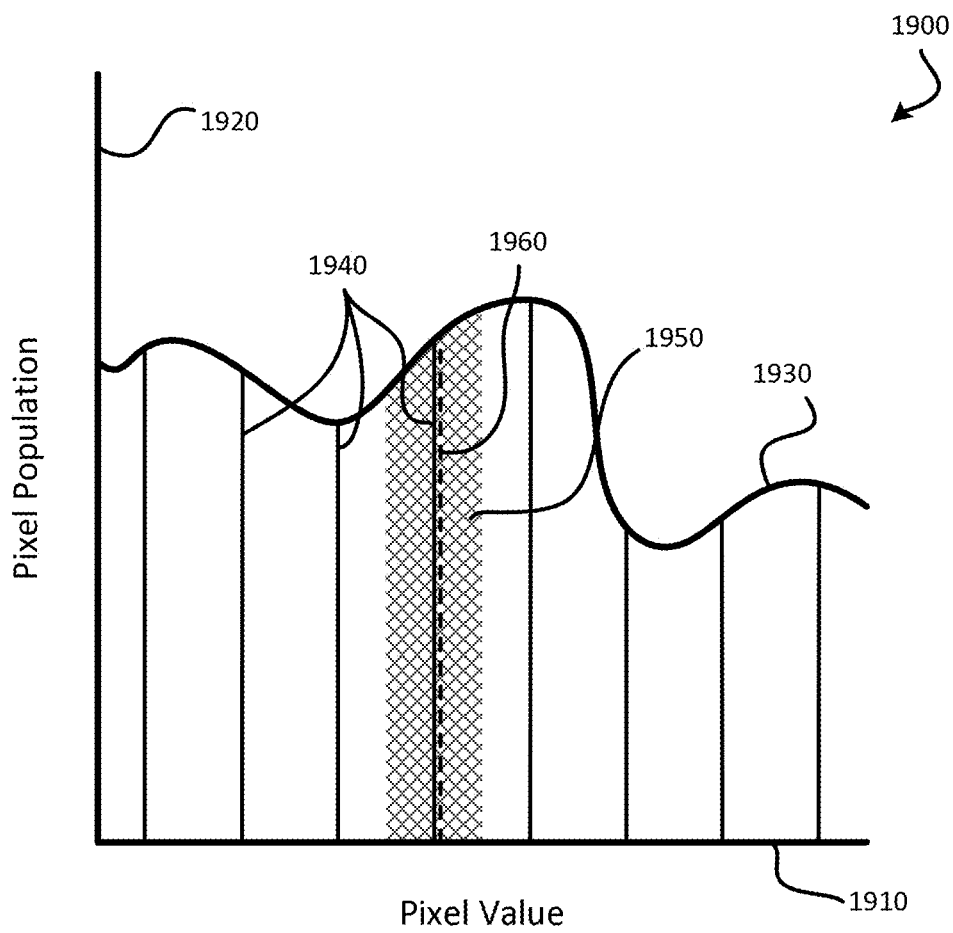
FIG. 19 depicts a histogram of a type that may be used to facilitate pixel color depth reduction in the form of K-means bit reduction.

FIG. 19 depicts a histogram 1900 of a type that may be used to facilitate pixel color depth reduction in the form of K-means bit reduction. Any of a variety of pixel color depth reduction techniques, or "bit reduction" techniques, may be employed as part of the step 1830. Such bit reduction techniques may be used to reduce the number of bits required to encode each pixel of the light field image from N bits to M bits, where M<N. One exemplary technique is the K-means bit reduction algorithm.

As shown in FIG. 19, the histogram 1900 may have a horizontal axis 1910 of pixel values present within the light field image (prior to bit reduction). The horizontal axis 1910 may extend from 0 to $2^N-1$ (for example, 0-4095 in the case of a 12-bit color depth prior to reduction). The histogram 1900 may also have a vertical axis 1920 of pixel populations, and may extend from 0 to the largest number of pixels at any single value. The histogram 1900 may have a line 1930 indicating the population (i.e., the number of pixels) in the light field image with each value. The shape of the line 1930 in FIG. 19 is merely exemplary.

The K-means bit reduction algorithm may commence with the division of the histogram 1900 into $2^M$ boundaries 1940, which may be evenly spaced apart as shown, or may be unevenly spaced apart. Then, the method may determine which values on the horizontal axis 1910 are closest to each boundary. This is shown in FIG. 19 by a shaded region 1950, which is the set of pixels closest to the boundary 1940 that is centered within the shaded region 1950.

The horizontal center of mass of the pixels closest to each boundary 1940 may then be calculated. For the example of the boundary 1940 within the shaded region 1950, a dashed line adjacent the boundary 1940 may represent the horizontal center of mass 1960 of the shaded region 1950. Note that, due to the slope of the line 1930 where it defines the top boundary of the shaded region 1950, the center of mass 1960 may be positioned just to the right of the boundary 1940. The horizontal center of mass of the pixels nearest to each of the boundaries 1940 may similarly be calculated.

Once the horizontal center of mass of each region has been determined, the boundaries 1940 may each be moved to the corresponding horizontal center of mass 1960. This may complete the first iteration of the K-means bit reduction method. The K-means bit reduction algorithm may be iterative, and may thus continue with another determination of which values on the horizontal axis 1910 are closest to each new boundary 1940, calculation of the corresponding horizontal center of mass, and motion of each boundary 1940 to the corresponding horizontal center of mass.

The method may iterate for as long as desired. In some embodiments, the K-means algorithm may iterate until the boundaries 1940 are no longer shifting. In other embodiments, the K-means algorithm may iterate for a predetermined number of cycles, such as 30.

Once the iteration is complete, the pixel values of all pixels closest to each boundary 1940 may be changed to the pixel value of the corresponding boundary 1940. In this way, the number of bits required to encode each pixel may be reduced from N bits to M bits. The K-means algorithm may tend to place boundaries 1940 closer together where the slope of the histogram 1900 is relatively large (positive or negative); this may beneficially result in a higher density of pixel values applied where the pixel values change most rapidly. Thus, the resulting reduced color depth may have better resolution at the pixel values that are most in need of higher resolution, i.e., those that exhibit relatively high-frequency change.

If desired, color depth reduction parameters may be stored for later use in processing and/or decoding the image. Such color depth reduction parameters may include a mapping of which of the N pixel values were changed to each of the M pixel values. Such information may facilitate subsequent decompression of the image.

Retiling

Figure 20:
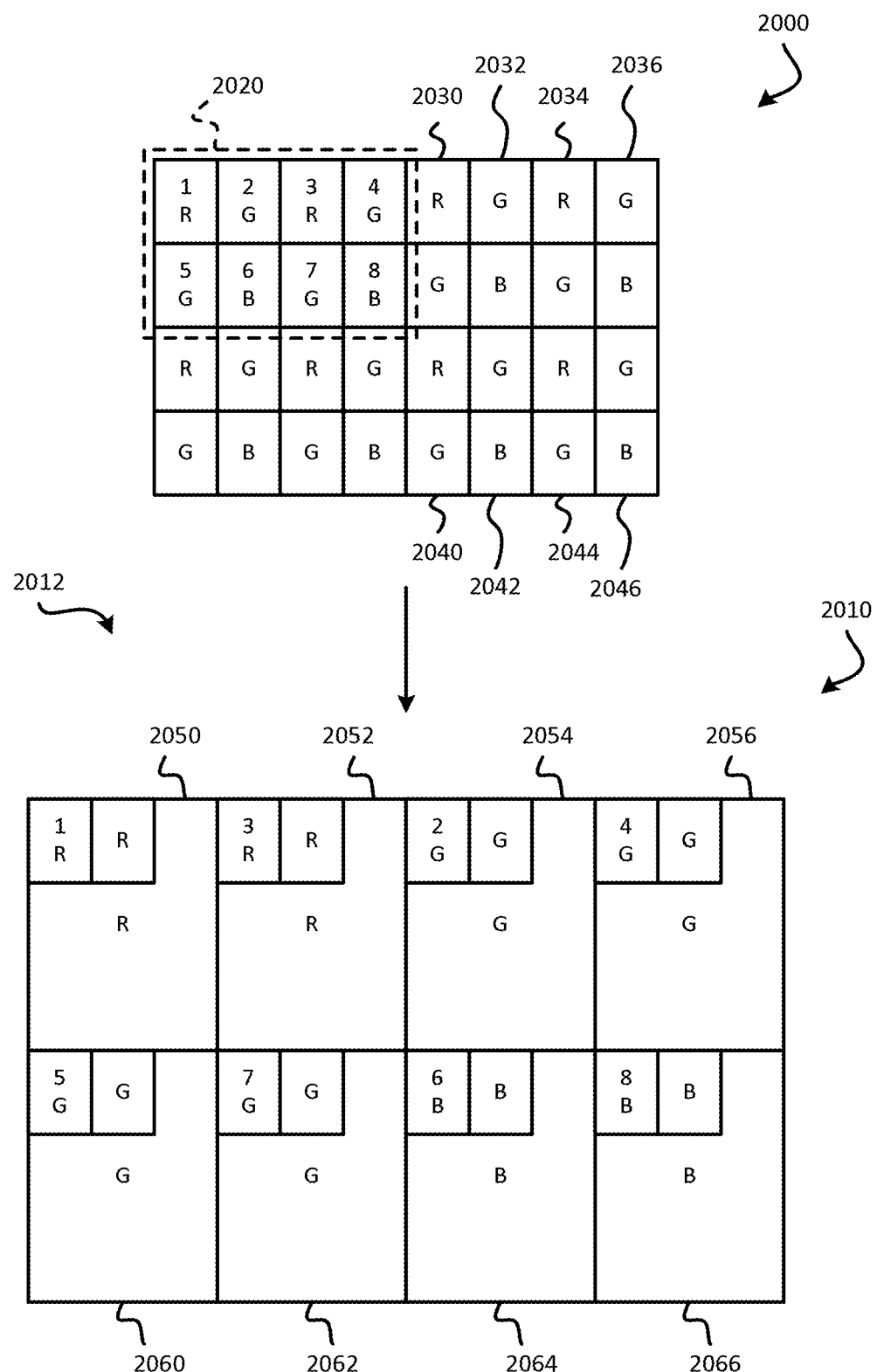
FIG. 20 depicts a mapping of pixels from pixel clusters of the image to retiled pixel clusters to form a retiled image.

FIG. 20 depicts a mapping of pixels from pixel clusters 2000 of the light field image to retiled pixel clusters 2010 to form a retiled image 2012. As mentioned previously, the light field image may be retiled so that pixels of different pixel clusters are grouped together in a manner that groups pixels of similar colors and/or pixels of similar intensities. FIG. 20 depicts one manner in which this may be accomplished.

In the example of FIG. 20, each of the pixel clusters 2000 may have a grid pattern with two rows of four columns, i.e., a 2×4 grid. A first pixel cluster 2020, shown in dashed lines, is exemplary. The pixel clusters 2000 shown in FIG. 20 may include four pixel clusters, each of which may have the same grid pattern as the first pixel cluster 2020.

The first pixel cluster 2020 is shown with pixels numbered 1 through 8. Thus, each of the pixel clusters 2000 may have a top row including a first pixel 2030, a second pixel 2032, a third pixel 2034, and fourth pixel 2036. Similarly, each of the pixel clusters may have a bottom row including a fifth pixel 2040, a sixth pixel 2042, a seventh pixel 2044, and an eighth pixel 2046.

As illustrated in FIG. 20, the first pixel cluster 2020 has a Bayer mosaic pattern; thus, the first pixel cluster 2020 has eight pixels including two groups of four (2×2) pixels. Each 2×2 grouping may have the RGGB Bayer pattern, as seen in pixels 1, 2, 5, and 6 of the first pixel cluster 220. The same pattern may be repeated in pixels 3, 4, 7, and 8 of the first pixel cluster 220.

The grouping of pixels in the Bayer mosaic pattern (or other raw mosaic pattern, as applicable) may advantageously be rearranged to group pixels of the same color next to each other. Additionally, it may be helpful to group pixels at the same position within the various pixel clusters 2000 together because, due to the vignetting that may be present in each of the pixel clusters 2000, the intensity of a given pixel may be determined, at least in part, by its location within the pixel cluster 2000.

The retiled pixel clusters 2010 may accomplish this regrouping by grouping the first pixel 2030 of each of the pixel clusters 2000 together, grouping the second pixel 2032 of each of the pixel clusters 2000 together, etc. Thus, the retiled pixel clusters 2010 may include eight retiled pixel clusters, which may include a first retiled pixel cluster 2050, a second retiled pixel cluster 2052, a third retiled pixel cluster 2054, a fourth retiled pixel cluster 2056, a fifth retiled pixel cluster 2060, a sixth retiled pixel cluster 2062, a seventh retiled pixel cluster 2064, and an eighth retiled pixel cluster 2066. The retiled pixel clusters 2010 may be arranged in the same 2×4 grid pattern as the pixels of each of the pixel clusters 2000 to form the retiled image 2012. Thus, there may be a one-to-one correspondence between the pixels of each of the pixel cluster 2000 and the retiled pixel clusters 2010 of the retiled image 2012.

Rather than duplicating the mosaic pattern of the pixels of each of the pixel clusters 2000, the retiled pixel clusters 2010 may be arranged such that pixels of the same color are, to the extent possible, grouped next to each other. Hence, the first pixels 2030 of each of the pixel clusters 2000 may be placed in the first retiled pixel cluster 2050, and the third pixels 2034 of each of the pixel clusters 2000 may be placed together in the second retiled pixel cluster 2010, which may be adjacent to the first retiled pixel cluster 2050. Similarly, the second pixels 2032 may be placed in the third retiled pixel cluster 2054 and the fourth pixels 2036 may be placed in the fourth retiled pixel cluster 2056. The fifth pixels 2040 may be placed in the fifth retiled pixel cluster 2060, the seventh pixels 2044 may be placed in the sixth retiled pixel cluster 2062, the sixth pixels 2042 may be placed in the seventh retiled pixel cluster 2064, and the eighth pixels 2046 may be placed in the eighth retiled pixel cluster 2066.

Within each of the retiled pixel clusters 2010, the pixels from different pixel clusters 2000 may be spatially arranged according to the placement of the pixel clusters 2000 relative to each other. Thus, the pixels of the first pixel cluster 2020 may be placed at the upper left of each of the retiled pixel clusters 2010. The pixels of the pixel cluster 2000 to the right of the first pixel cluster 2020 may be placed to the right of the pixels of the first pixel cluster 2020, and the pixels of the pixel cluster 2000 below the first pixel cluster 2020 may be placed below the pixels of the first pixel cluster 2020, and so on.

More generally, with microlens pitch that is approximately $N_x$ pixels in one direction, and $N_y$ pixels in the orthogonal direction, the light field image can be retiled into $N_x*N_y$ sub images. The first row of the first sub image can be formed by selecting the corner pixel of the image and every $N_x$ pixel along the row. Similarly, the columns may be formed by starting at the same corner pixel and selecting every $N_y$ pixel in the Y-direction. The next sub image can be formed by repeating the procedure for the pixel next to the corner pixel.

In the example of FIG. 20, the retiled image 2012 may have only eight retiled pixel clusters 2010 shown. The pixel clusters 2000 may include more pixel clusters (not shown) than the four shown in FIG. 20; the pixels of such pixel clusters may be arranged in the eight retiled pixel clusters 2010 in the manner indicated above. The use of eight pixel clusters 2010 is merely exemplary; in alternative embodiments (not shown) in which each pixel cluster includes more or less than eight pixels, the retiled image may have similarly have more or fewer than eight pixels, which may be arranged in the same grid pattern as that of the pixel clusters.

Returning to the example of FIG. 20, in the manner indicated above, red pixels may be grouped together in the first retiled pixel cluster 2050 and the second retiled pixel cluster 2052. Green pixels may be grouped together in the third retiled pixel cluster 2054, the fourth retiled pixel cluster 2056, the fifth retiled pixel cluster 2060, and the sixth retiled pixel cluster 2062. Red pixels may be grouped together in the seventh retiled pixel cluster 2064 and the eighth retiled pixel cluster 2066. Thus, in the retiled image 2012, pixels from the pixel clusters 2000 may be grouped so that pixels of the same color are grouped together, with pixels of similar probable intensities also grouped relatively close together. Such grouping may enhance the operation of the image compression algorithm that may be applied subsequently by facilitating the ability of such an image compression algorithm to break up the retiled image into tiles with similar pixel colors and intensities. Additionally, the manner in which pixel intensities are grouped together may further enhance the performance of the image compression by reducing the spatial variation in pixel intensity.

If desired, retiling parameters may be stored for later use in processing and/or decoding the image. Such retiling parameters may include a mapping of the original location of each pixel of the retiled pixel clusters 2010. Such information may facilitate subsequent decompression of the image.

Figure 21A:
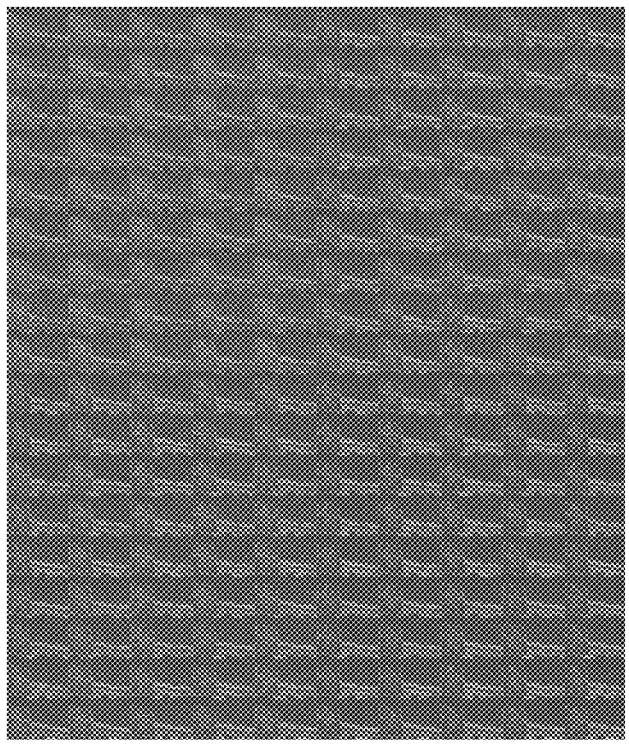
FIG. 21A depicts a retiled light field image.

FIG. 21A depicts a retiled light field image 2100 generated by a process such as that described in connection with FIG. 20. The retiled light field image 2100 may generally be divided into four quadrants, which may have different colors. Each quadrant may have multiple miniature copies of the raw light field image 1700.

Figure 21B:
FIG. 21B depicts an enlarged portion of the retiled light field image of FIG. 21A.

FIG. 21B depicts an enlarged portion 2150 of the retiled light field image of FIG. 21A. As shown, the high-frequency artifacts, or high-frequency pixel intensity variations, of FIG. 17B have been effectively removed from the enlarged portion 2150. Thus, an image compression algorithm is likely to achieve better results with the retiled light field image 2100.

Padding

Figure 22:
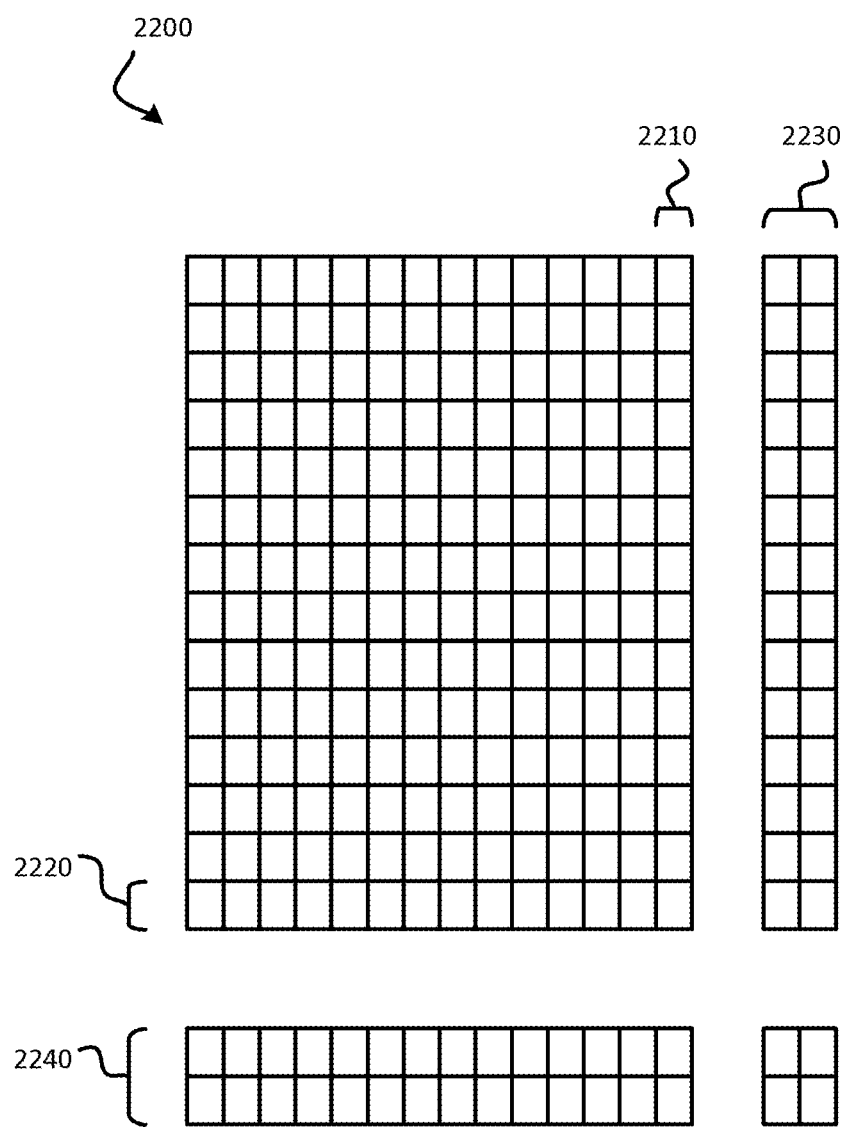
FIG. 22 depicts a padding process for adding one or more pixel rows and/or columns to the retiled image.

FIG. 22 depicts a padding process for adding one or more pixel rows and/or columns to a retiled image 2200. As described above, image compression algorithms may divide an image into tiles of a certain size, and may perform best when used with images that are sized as multiples of the tile size. As mentioned previously, JPEG image compression algorithms may process tiles of 16×8 pixels or 8×8 pixels.

The retiled image 2200 of FIG. 22 is a 14×14 image. Thus, without modification, it may not be the optimal size for application of a JPEG compression algorithm. The retiled image 2200 may thus be padded with additional rows and/or columns in order cause it to have a number of pixel rows that is an integer multiple of the number of pixel rows in the JPEG tile size, and a number of pixel columns that is an integer multiple of the number of pixel columns in the JPEG tile size. Adding two pixel rows and two pixel columns may cause the retiled image 2200 to conform to both 16×8 and 8×8 tile sizes.

This may be done, for example, by duplicating the adjacent edge pixel column and the adjacent edge pixel row, as applicable. For example, the retiled image 2200 may have a pixel edge column 2210 at the right-hand side of the retiled image 2200 and a pixel edge row 2220 at the bottom of the retiled image 2200. The retiled image 2200 may be padded by adding two pixel columns 2230 to the right-hand side of the retiled image 2200, adjacent to the pixel edge column 2210, and by adding two pixel rows 2240 to the bottom of the retiled image 2200, adjacent to the pixel edge row 2220.

The content of the pixel columns 2230 and the pixel rows 2240 may be unimportant, since they may subsequently be removed as part of the decompression process. In order to facilitate image compression, each of the pixel columns 2230 may be a copy of the pixel edge column 2210, and each of the pixel rows 2240 may be a copy of the pixel edge row 2220.

If desired, image padding parameters may be stored for later use in processing and/or decoding the image. Such padding parameters may include an indication of the pixel columns (for example, the pixel columns 2230 of FIG. 22) and/or pixel rows (for example, the pixel rows 2240 of FIG. 22) that were added. Such information may facilitate subsequent decompression of the image.

Compression

As mentioned previously, the padded image may be ready for compression, which may be performed through the use of known image compression algorithms and/or through the use of the RAW image compression techniques set forth in connection with FIGS. 7A through 16 herein. After the image has been compressed via the image compression algorithm, it may be assembled into an image file.

Image File

Figure 23:
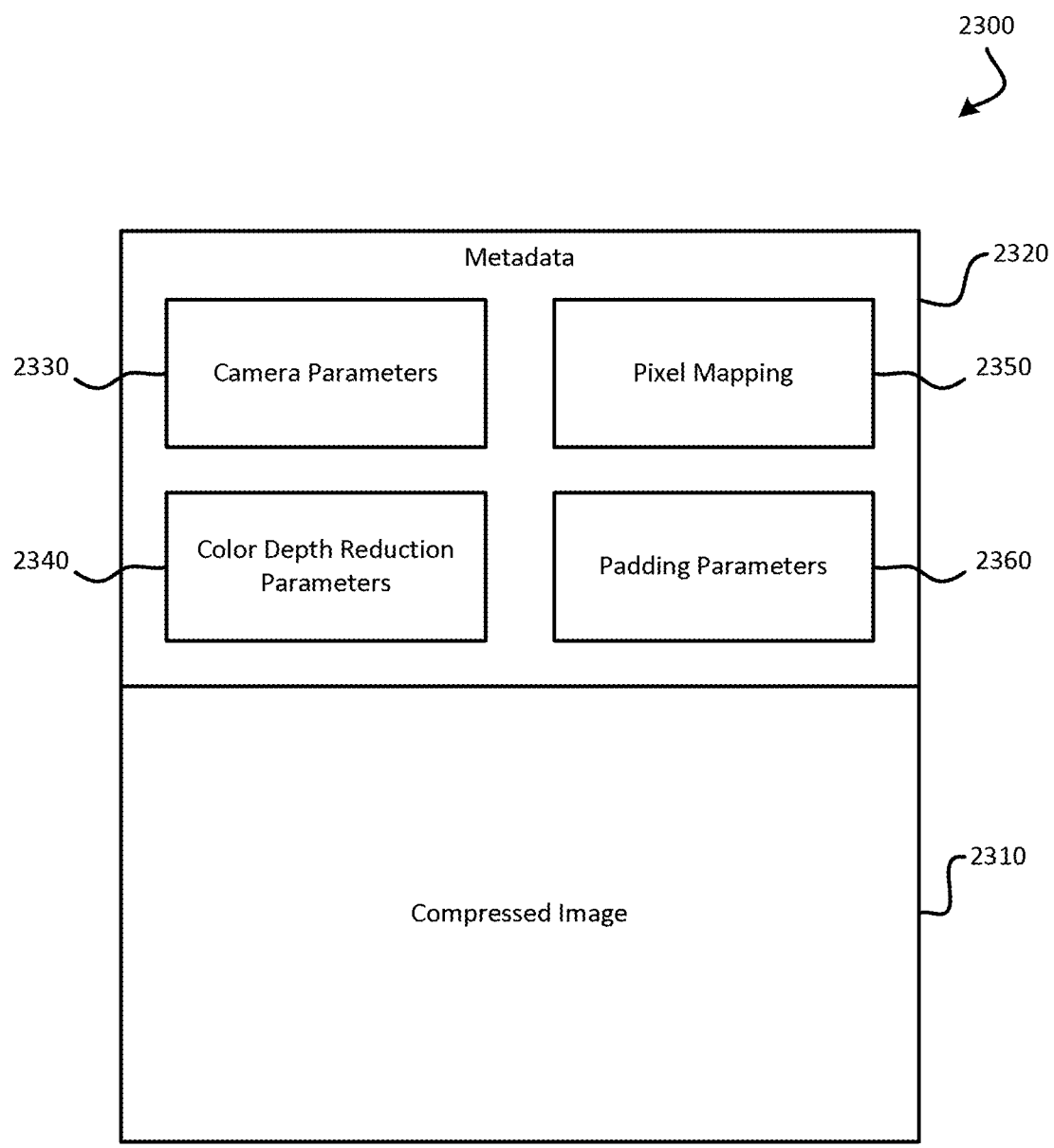
FIG. 23 depicts an image file that may be stored after assembly of the compressed light field image and metadata.

FIG. 23 depicts an image file 2300 that may be stored after assembly of the compressed image 2310 and metadata 2320. The metadata 2320 may include any of a number of pieces of information that may be helpful in further processing, decompression, and/or use of the compressed image 2310.

For example, the metadata 2320 may include camera parameters 2330 that indicate the state of one or more camera settings when the light field image, from which the compressed image 2310 is derived, was captured. Such parameters may facilitate a wide variety of image processing techniques.

Additionally or alternatively, the metadata 2320 may include color depth reduction parameters 2340, a pixel mapping 2350, and/or padding parameters 2360. As set forth above, the color depth reduction parameters 2340, the pixel mapping 2350, and the padding parameters 2360 may provide information regarding how the step 1830, the step 1840, and the step 1850, respectively, were carried out.

Such information may facilitate image processing and in particular, decompression of the compressed image 2310 to enable the compressed image 2310 to be refocused and/or otherwise manipulated according to light field image usage techniques. More specifically, the color depth reduction parameters 2340, the pixel mapping 2350, and the padding parameters 2360 may be used to facilitate reversal of the step 1830, the step 1840, and the step 1850, respectively.

The metadata 2320 is merely exemplary; in alternative embodiments, metadata may not have some of the components illustrated in FIG. 23. Additionally or alternatively, such metadata may have additional components not shown in FIG. 23. If desired, the metadata 2320 may have image compression parameters that indicate the type of image compression algorithm used in the step 1860, the applicable parameters, or the like.

Through the use of the present invention, light field images may be compressed to a fraction of their original size. In some embodiments, the size of the compressed image may be approximately ⅓ the size of the RAW light field image. The compression may be a lossy compression; accordingly, the compressed image may lack the data needed to restore the exact original RAW light field image. However, through the use of the present invention, the decompressed image may retain the full functionality of the original RAW light field image and may sufficiently similar to the original RAW light field image that the user may not notice any difference.

Those of skill in the art will recognize that other compression ratios are possible with modification of the steps set forth previously. It is to be expected that additional compression will result in additional data loss, and therefore may increase the likelihood that the user will perceive a difference in image quality between the decompressed image and the original RAW light field image.

Processing of Compressed Image

Figure 24:
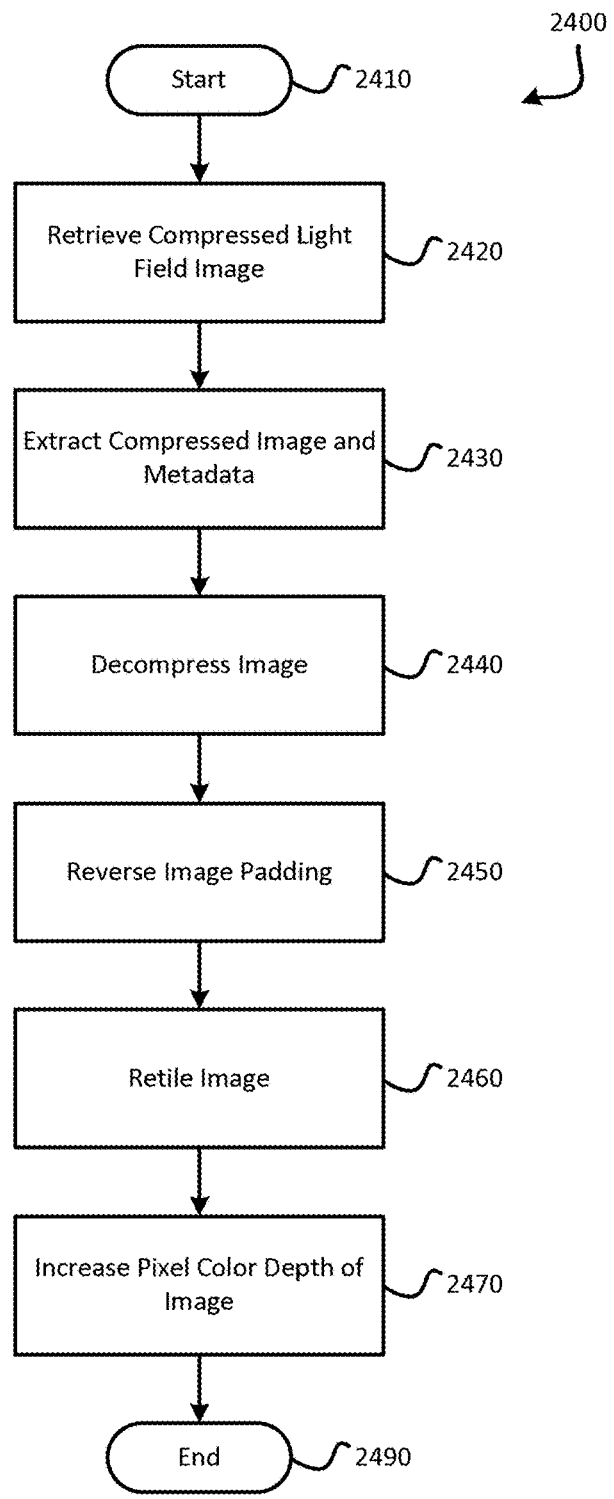
FIG. 24 depicts a method for processing a compressed image for use, wherein the compressed image has been compressed with a method such as that of FIG. 18.

FIG. 24 depicts a method 2400 for processing a compressed image for use, wherein the compressed image has been compressed with a method such as the method 1800 of FIG. 18. The method 2400 may be substantially the reverse of the method 1800. Thus, the steps of the method 2400 may generally be the inverse of those of FIG. 18, performed in the opposite order.

More specifically, the method 2400 may start 2410 with a step 2420 in which the compressed light field image file is retrieved, for example, from the camera 100, the memory 111, and/or any other data storage system. Once the compressed light field image has been retrieved, the method 2400 may proceed to a step 2430 in which the compressed image 2310 and the metadata 2320 are extracted from the compressed image file.

The method 2400 may then proceed to a step 2440 in which the compressed image is decompressed. This may entail application of an image decompression algorithm of the image compression algorithm used to compress the light field image. Additionally or alternatively, the step 2440 may entail application of the image compression algorithm in reverse. Notably, the compression of the light field image may be lossy, so application of the image decompression algorithm or application of the image compression algorithm in reverse may not restore all data present in the original RAW light field image.

Once the step 2440 has been carried out, the method 2400 may proceed to a step 2450 in which any padding process applied to derive the compressed image is reversed. This may entail deletion of any added pixel rows and/or pixel columns, such as the pixel columns 2230 and/or the pixel rows 2240 of FIG. 22. Data from the metadata 2320, such as the padding parameters 2360, may be used to facilitate this process.

Once any padding has been removed, the method 2400 may proceed to a step 2460 in which the image is again retiled. This may entail restoring the structure of the original pixel clusters, i.e., the pixel clusters 2000 of FIG. 20. The retiled image may then have pixel clusters that correspond to individual microlenses 401 of the microlens array 102, like those of the original RAW light field image. Thus, the step 2460 may again enable refocusing and other processes unique to light field images. Data from the metadata 2320, such as the pixel mapping 2350, may be used to facilitate this process.

Once the image has been retiled, the method 2400 may proceed to a step 2470 in which the color depth of the pixels of the retiled image is again increased. If desired, the original color depth may be used, so that the color depth of each pixel may be increased from M bits to N bits, where N>M. Notably, the data to restore each pixel to its original intensity value may not be present. However, increasing the pixel color depth may help to facilitate further processes that may be dependent upon a higher bit depth.

Once the step 2470 is complete, the decompressed image may be ready for use, and may be viewed, processed, converted, and/or otherwise used in a manner comparable to that of the original RAW light field image. The method 2400 may then end 2490.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for processing a compressed image derived from a raw image projected from light field data acquired through a microlens array, the method comprising:
   retrieving a compressed image derived from a raw image projected from light field data, wherein the compressed image comprises a plurality of retiled pixel clusters; and
   at a processor, retiling the compressed image to generate an image comprising a plurality of pixel clusters, each of which comprises a pixel from each of the retiled pixel clusters;
   wherein each of the pixel clusters in the generated image encodes a portion of the light field data corresponding to a microlens of the microlens array.

2. The method of claim 1, wherein retiling the compressed image comprises substantially reversing a retiling process previously carried out in a compression process by which the compressed image was derived from the raw image.

3. The method of claim 2, wherein the reified pixel clusters are arranged in rows and columns to define a grid pattern, wherein railing the compressed image comprises generating the image such that there is a one-to-one correspondence between the retiled pixel clusters and the pixels of each pixel cluster in the generated image, so that each pixel cluster in the generated image has the grid pattern.

4. The method of claim 2, further comprising decompressing a selection from the group consisting of the compressed image and the generated image, wherein decompressing the selection comprises substantially reversing application of an image compression algorithm previously applied as part of the compression process.

5. The method of claim 2, further comprising increasing a color depth of pixels of a selection from the group consisting of the compressed image and the generated image, wherein increasing the color depth of pixels of the selection comprises substantially reversing a color depth reduction process previously applied as part of the compression process.

6. The method of claim 5, wherein the color depth reduction process comprises application of a K-means bit reduction algorithm, wherein the compressed image comprises metadata comprising color depth reduction parameters indicating how the K-means bit reduction algorithm was performed, wherein substantially reversing the color depth reduction process comprises using the color depth reduction parameters to map color values of pixels of the selection to corresponding color values of the pixels prior to application of the K-means bit reduction algorithm.

7. The method of claim 2, further comprising substantially reversing a padding process previously carried out as part of the compression process, wherein substantially reversing the padding process comprises removing, from the compressed image or the generated image, a selection from the group consisting of:
 a pixel edge column substantially identical to a pixel column adjacent to it; and
 a pixel edge row substantially identical to a pixel row adjacent to it.

8. A non-transitory computer-readable medium for processing a compressed image derived from a raw image projected from light field data acquired through a microlens array, comprising instructions stored thereon, that when executed by a processor, perform the steps of:
 retrieving a compressed image derived from a raw image projected from light field data, wherein the compressed image comprises a plurality of retiled pixel clusters; and
 retiling the compressed image to generate an image comprising a plurality of pixel clusters, each of which comprises a pixel from each of the retiled pixel clusters;
 wherein each of the pixel clusters in the generated image encodes a portion of the light field data corresponding to a microlens of the microlens array.

9. The non-transitory computer-readable medium of claim 8, wherein retiling the compressed image comprises substantially reversing a retiling process previously carried out in a compression process by which the compressed image was derived from the raw image.

10. The non-transitory computer-readable medium of claim 9, further comprising instructions stored thereon, that when executed by a processor, perform the step of:
 decompressing a selection from the group consisting of the compressed image and the generated image, by substantially reversing application of an image compression algorithm previously applied as part of the compression process.

11. The non-transitory computer-readable medium of claim 9, further comprising instructions stored thereon, that when executed by a processor, perform the step of:
 increasing a color depth of pixels of a selection from the group consisting of the compressed image and the generated image by substantially reversing a color depth reduction process previously applied as part of the compression process.

12. A system for processing a compressed image derived from a raw image projected from light field data acquired through a microlens array, the system comprising:
 a storage device, configured to store an image; and
 a processor, communicatively coupled to the storage device, configured to:
 retrieve, from the storage device, a compressed image derived from a raw image projected from light field data, wherein the compressed image comprises a plurality of retiled pixel clusters; and
 retile the compressed image to generate an image comprising a plurality of pixel clusters, each of which comprises a pixel from each of the retiled pixel clusters;
 wherein each of the pixel clusters in the generated image encodes a portion of the light field data corresponding to a microlens of the microlens array.

13. The system of claim 12, wherein the processor is configured to retile the compressed image by substantially reversing a retiling process previously carried out in a compression process by which the compressed image was derived from the raw image.

14. The system of claim 13, wherein the processor is further configured to:
 decompress a selection from the group consisting of the compressed image and the generated image by substantially reversing application of an image compression algorithm previously applied as part of the compression process.

15. The system of claim 13, wherein the processor is further configured to:
 increase a color depth of pixels of a selection from the group consisting of the compressed image and the generated image by substantially reversing a color depth reduction process previously applied as part of the compression process.

16. The method of claim 1, wherein retrieving a compressing image comprises extracting a compressed image from a compressed image file.

17. The method of claim 16, further comprising extracting metadata from the compressed image file;
 and wherein retiling the compressed image is performed using the extracted metadata.

18. The non-transitory computer-readable medium of claim 9, further comprising instructions stored thereon, that when executed by a processor, perform the step of substantially reversing a padding process previously carried out as part of the compression process, wherein substantially reversing the padding process comprises removing, from the compressed image or the generated image, a selection from the group consisting of:
 a pixel edge column substantially identical to a pixel column adjacent to it; and
 a pixel edge row substantially identical to a pixel row adjacent to it.

19. The non-transitory computer-readable medium of claim 8, wherein retrieving a compressing image comprises extracting a compressed image from a compressed image file.

20. The non-transitory computer-readable medium of claim 19, further comprising instructions stored thereon, that when executed by a processor, perform the step of extracting metadata from the compressed image file;
 and wherein retiling the compressed image is performed using the extracted metadata.

21. The system of claim 13, wherein the processor is further configured to perform the step of substantially reversing a padding process previously carried out as part of the compression process, wherein substantially reversing the padding process comprises removing, from the compressed image or the generated image, a selection from the group consisting of:
 a pixel edge column substantially identical to a pixel column adjacent to it; and
 a pixel edge row substantially identical to a pixel row adjacent to it.

22. The system of claim 12, wherein the processor retrieving a compressing image comprises the processor extracting a compressed image from a compressed image file.

23. The system of claim 22, wherein the processor is further configured to perform the step of extracting metadata from the compressed image file;
 and wherein retiling the compressed image is performed using the extracted metadata.

* * * * *